US010185716B2

(12) United States Patent
Miyazaki et al.

(10) Patent No.: US 10,185,716 B2
(45) Date of Patent: Jan. 22, 2019

(54) COMPOSITE MEDIUM MANAGEMENT SYSTEM, INFORMATION MANAGEMENT SERVER APPARATUS, COMPOSITE ACCESS CONTROL CREATION APPARATUS, AND PROGRAM

(71) Applicants: Kabushiki Kaisha Toshiba, Minato-ku (JP); Toshiba Solutions Corporation, Kawasaki-shi (JP)

(72) Inventors: Shingo Miyazaki, Fuchu (JP); Tatsuro Ikeda, Fuchu (JP); Tomoaki Morijiri, Chofu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 1112 days.

(21) Appl. No.: 14/497,594

(22) Filed: Sep. 26, 2014

(65) Prior Publication Data

US 2015/0012508 A1    Jan. 8, 2015

Related U.S. Application Data

(63) Continuation of application No. PCT/JP2013/052405, filed on Feb. 1, 2013.

(30) Foreign Application Priority Data

Mar. 28, 2012   (JP) ................................. 2012-074579

(51) Int. Cl.
*G06F 17/30* (2006.01)
*G06F 21/62* (2013.01)

(52) U.S. Cl.
CPC .. *G06F 17/30011* (2013.01); *G06F 17/30292* (2013.01); *G06F 21/62* (2013.01)

(58) Field of Classification Search
None
See application file for complete search history.

(56) References Cited

U.S. PATENT DOCUMENTS 8,868,506 B1 * 10/2014 Bhargava .......... G06F 17/30011
707/648
2004/0003010 A1    1/2004 Akazawa et al.
(Continued)

FOREIGN PATENT DOCUMENTS

CN       101251842 A     8/2008
EP       2 003 586 A2   12/2008
(Continued)

OTHER PUBLICATIONS

Combined Office Action and Search Report dated Mar. 15, 2016 in Chinese Patent Application No. 201380012059.6 (with English translation).
(Continued)

*Primary Examiner* — Neveen Abel Jalil
*Assistant Examiner* — Katriel Y Chiu
(74) *Attorney, Agent, or Firm* — Oblon, McClelland, Maier & Neustadt, L.L.P.

(57) ABSTRACT

Upon receiving a medium storage request from a client apparatus, an information management server apparatus according to an embodiment evaluates, based on at least one policy file read out based on at least one parent management ID in the medium storage request and user information in the medium storage request, whether medium storage responding to the medium storage request is possible. Upon evaluating that the medium storage is possible, the information management server apparatus creates composite access control which do not violate any management rules included in the at least one policy file.

16 Claims, 28 Drawing Sheets

(56) References Cited

U.S. PATENT DOCUMENTS

| | | | |
|---|---|---|---|
| 2004/0268254 A1* | 12/2004 | Fujiwara | G06F 17/30011 715/255 |
| 2006/0080314 A1* | 4/2006 | Hubert | G06F 17/30011 |
| 2006/0294152 A1* | 12/2006 | Kawabe | G06F 17/30011 |
| 2008/0104663 A1 | 5/2008 | Tokutani et al. | |
| 2008/0172416 A1 | 7/2008 | Ito | |
| 2008/0201552 A1 | 8/2008 | Tokie | |
| 2008/0313702 A1 | 12/2008 | Imamoto | |

FOREIGN PATENT DOCUMENTS

| | | |
|---|---|---|
| JP | 2005-284883 A | 10/2005 |
| JP | 2008-004041 A | 1/2008 |
| JP | 2008-112279 A | 5/2008 |
| JP | 2008-117026 A | 5/2008 |
| JP | 2008-165515 A | 7/2008 |
| JP | 2008-192104 A | 8/2008 |
| JP | 2009-020872 A | 1/2009 |

OTHER PUBLICATIONS

"Whole-Text Database of Excellent Chines Thesis for Master's Degree, IT Collection", vol. 1, Design and Realization of Digital Right Management System based on document Protection, Jan. 15, 2008, 69 pages.

"Whole-Text Database of Excellent Chines Thesis for Master's Degree, IT Collection", vol. 4, Design and Realization of Document Protection System based on Internet, Oct. 15, 2007, 73 pages.

Office Action dated Aug. 31, 2016 in Chinese Patent Application No. 201380012059.6 (with English translation).

International Preliminary Report on Patentability and Written Opinion dated Oct. 9, 2014 in PCT/JP2013/052405.

International Search Report dated Apr. 23, 2013 for PCT/JP2013/052405 filed on Feb. 1, 2013 with English Translation.

International Written Opinion dated Apr. 23, 2013 for PCT/JP2013/052405 filed on Feb. 1, 2013.

* cited by examiner

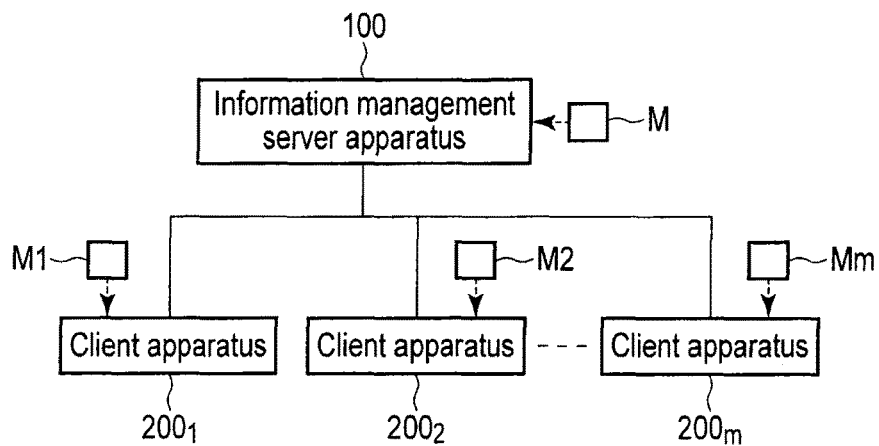
F I G. 1
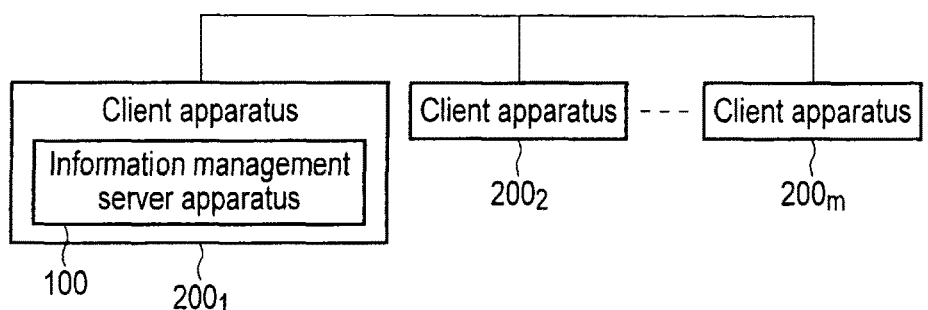
F I G. 2
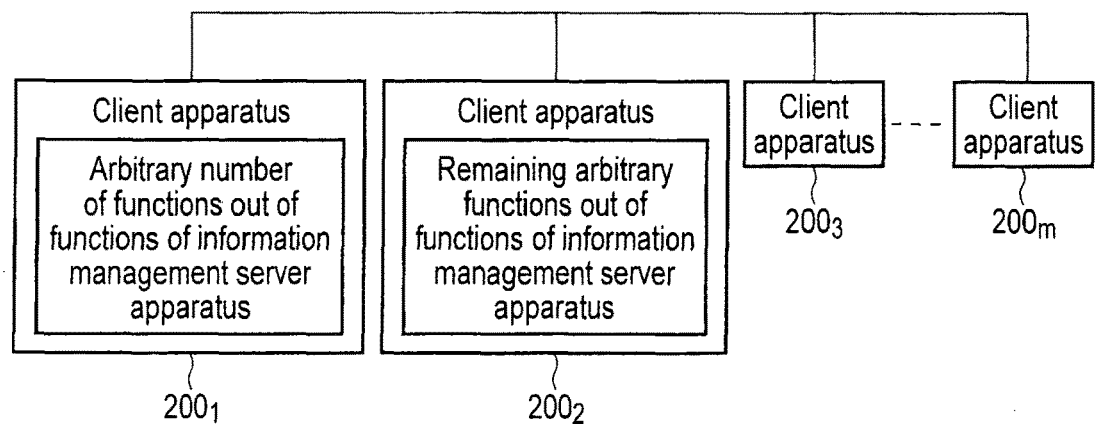
F I G. 3

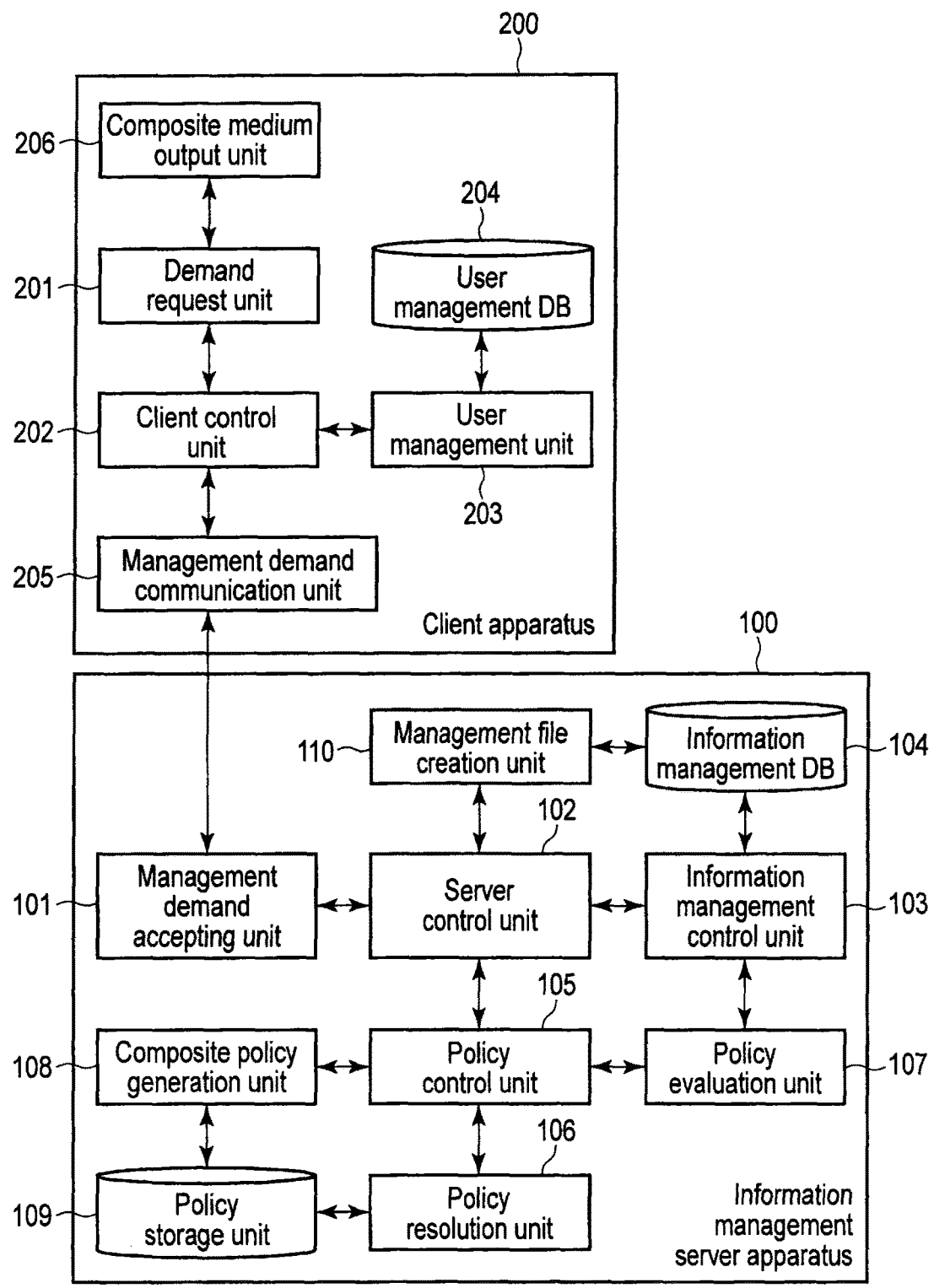
F I G. 5

System management table 1041

| Management ID | Parent management ID | Medium type | Document type | Storage medium ID | User ID | Management state | Access control |
|---|---|---|---|---|---|---|---|
| FF⋯0001 | Root | Original data | Personal contract | — | | In use | Term of safekeeping:2018/03/31 Takeout range:In company |
| FF⋯0002 | FF⋯0001 | Duplicated data | Personal contract | 99⋯0001 | 00004001 | In use | Term of Validity:2011/02/10 Takeout range:In company |
| FF⋯0003 | FF⋯0002 | Paper | Personal contract | 99⋯0002 | 00000001 | Discarded | Term of Validity:2011/02/17 Takeout range:In company |
| ⋯ | ⋯ | ⋯ | ⋯ | ⋯ | ⋯ | ⋯ | ⋯ |
| FF⋯9003 | FF⋯5001 | Duplicated data | Evidence of transaction | 99⋯0001 | 00004001 | In use | Term of safekeeping:2011/01/11 Takeout range:Reference room of headquarter |
| FF⋯9004 | FF⋯7001 | Paper | Personal identification record | 99⋯0002 | 00000001 | Discarded | Term of Validity:2011/03/15 Takeout range:Business establishment B |

F I G. 7

Composite medium management table 1042

| Storage medium ID | Storage management ID | User ID | Medium type | Management state | Composite access control |
|---|---|---|---|---|---|
| 99⋯0001 | FF⋯0002 FF⋯9003 | 00004001 | DVD | Discarded | Discard period:2011/01/11-02/10 Takeout range:Reference room of headquarter |
| 99⋯0002 | FF⋯0003 FF⋯9004 | 00000001 | Paper binder | In use | Discard period:Up to 2011/02/17 Takeout range:Business establishment B |
| ⋯ | ⋯ | ⋯ | ⋯ | ⋯ | ⋯ |

F I G. 8

1043

| Client management table | | | | |
|---|---|---|---|---|
| Client ID | User ID | Authorization class | Terminal type | MAC address |
| 0001 | 00000001 | Executive | Desktop PC | XXXXXXXX |
| 0002 | 00000001 | Executive | Notebook PC | XXXXXXXX |
| 0004 | 00000009 | Ordinary employee | Company portable phone | XXXXXXXX |
| ⋮ | ⋮ | ⋮ | ⋮ | ⋮ |
| 8999 | 00004001 | Manager | Notebook PC | XXXXXXXX |
| 9000 | 00005223 | Ordinary employee | Desktop PC | XXXXXXXX |

| Data original management table | |
|---|---|
| Entity ID | Management ID of data original |
| File name | File name of management target data main body to be stored in management file |
| Size | File size of management target data main body to be stored in management file |
| Hash value | Hash value of management target data main body to be stored in management file |
| Electronic data main body | Management target data main body to be stored in management file (when stored in information management DB) |
| External storage information | Storage destination information when separately storing management target data main body outside information management DB |

FIG. 10

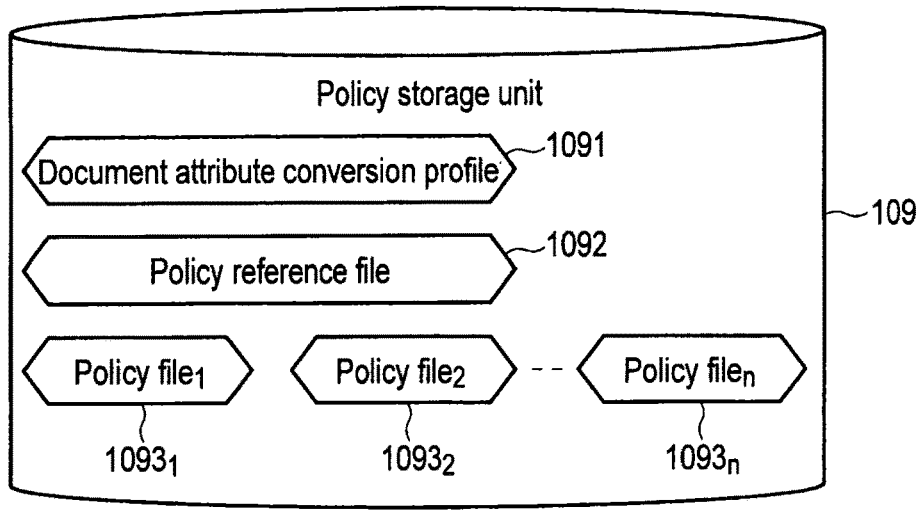

FIG. 11

1091 Document attribute conversion profile

```
<?xml version="1.0"encoding="UTF-8"standalone="yes"?>
<ResourceProfiles>
 <ResourceProfile Id="default_resource_profile">
  <ResourceCategory Id="Document type">
   <ResourceReferenceValue Id="Catalog">
    <ResourceTypeId>NoPersonal-Commodity</ResourceTypeId>
   </ResourceReferenceValue>
   <ResourceReferenceValue Id="Contract">
    <ResourceTypeId>Personal-Contract</ResourceTypeId>
   </ResourceReferenceValue>
   <ResourceReferenceValue Id="Paper for personal identification">
    <ResourceTypeId>Personal-Certification</ResourceTypeId>
   </ResourceReferenceValue>
  </ResourceCategory>
 </ResourceProfile>
</ResourceProfiles>
```

FIG. 12

1092 Policy reference file

```
<?xml version="1.0"encoding="UTF-8" standalone="yes"?>
<ResourceTypes>
  <ResourceType Id="NoPersonal-Commodity">
    <PolicyReferenceId PolicyType="operation">policy-01.xml</PolicyReferenceId>
  </ResourceType>
  <ResourceType Id="Personal-Contract">
    <PolicyReferenceId PolicyType="operation">policy-02.xml</PolicyReferenceId>
  </ResourceType>
  <ResourceType Id="Personal-Certification">
    <PolicyReferenceId PolicyType="operation">policy-03.xml</PolicyReferenceId>
  </ResourceType>
</ResourceTypes>
```

FIG. 13

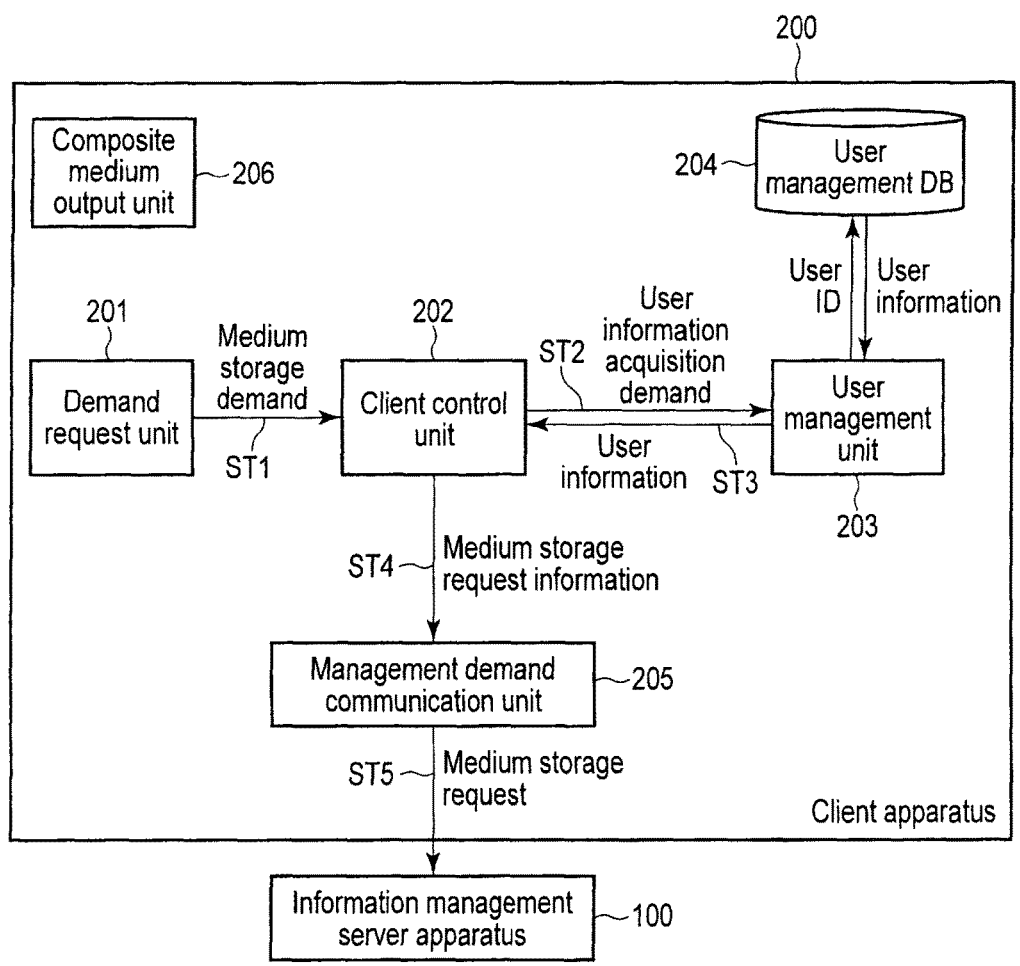
F I G. 15

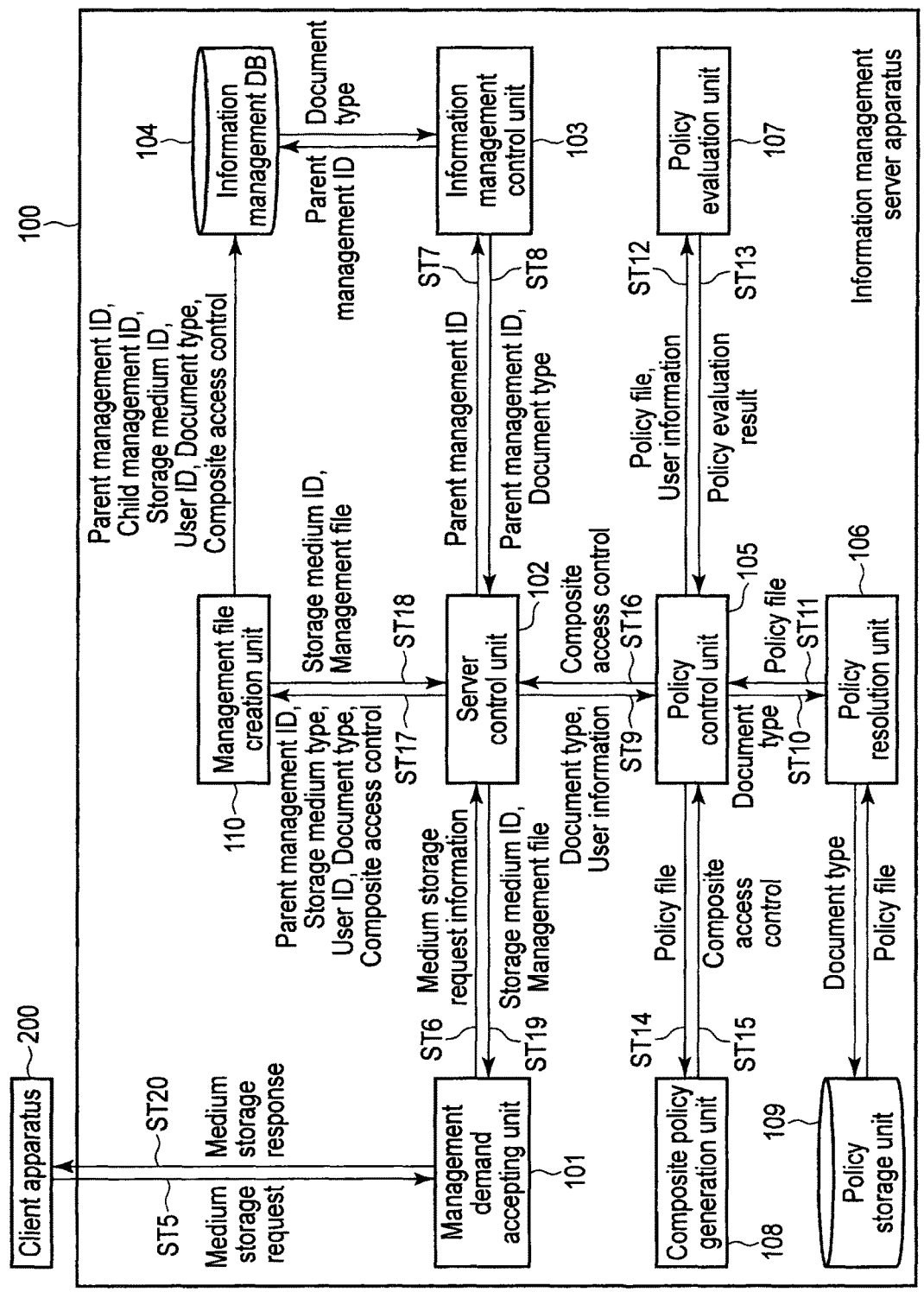
F I G. 16

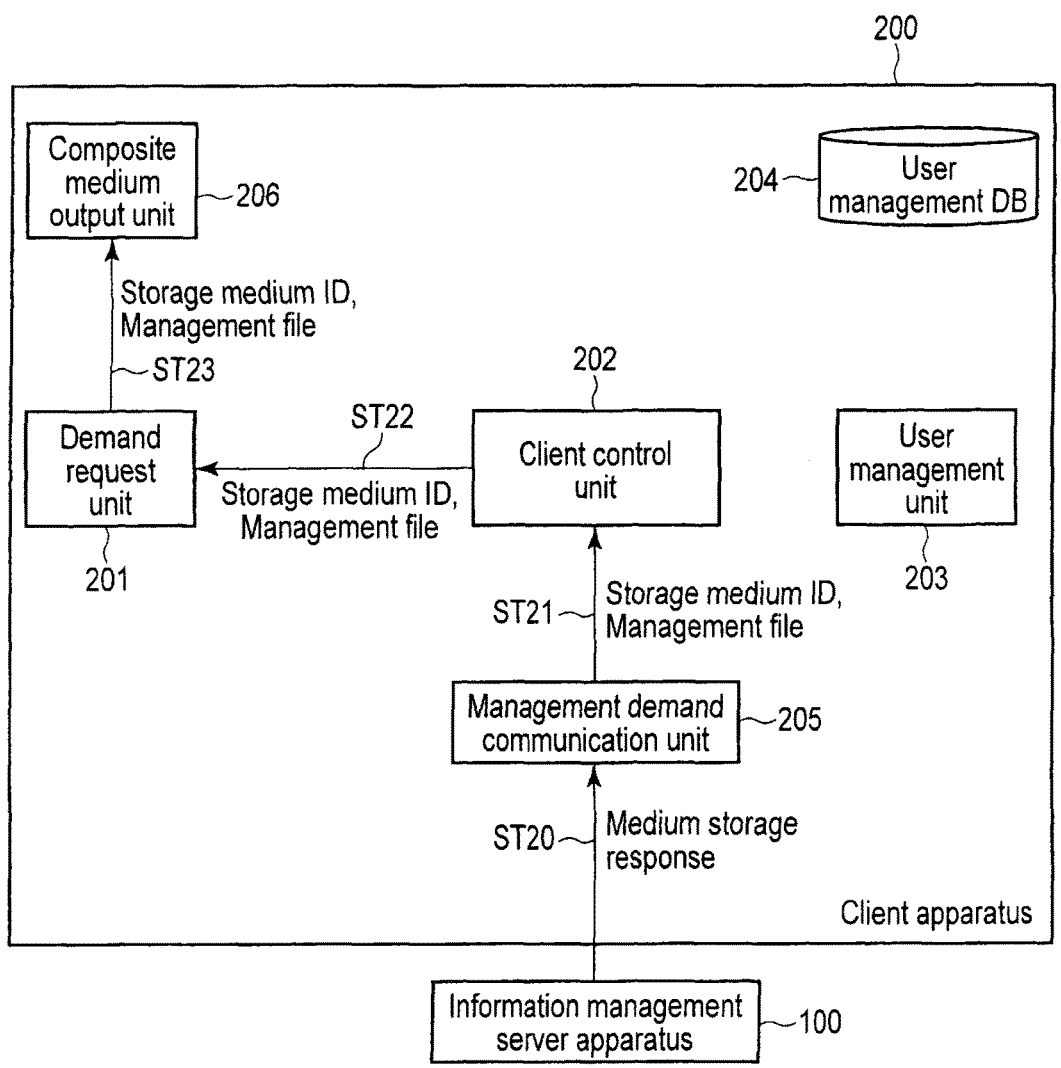
F I G. 17

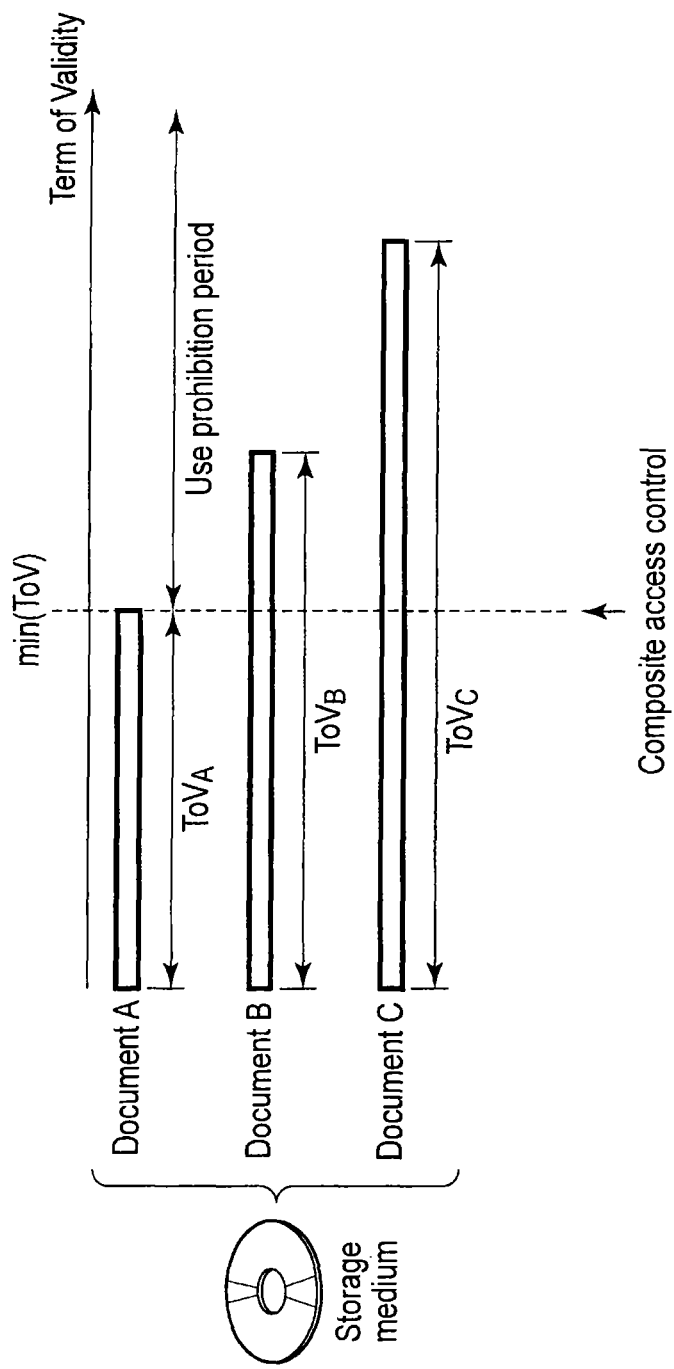
F I G. 20

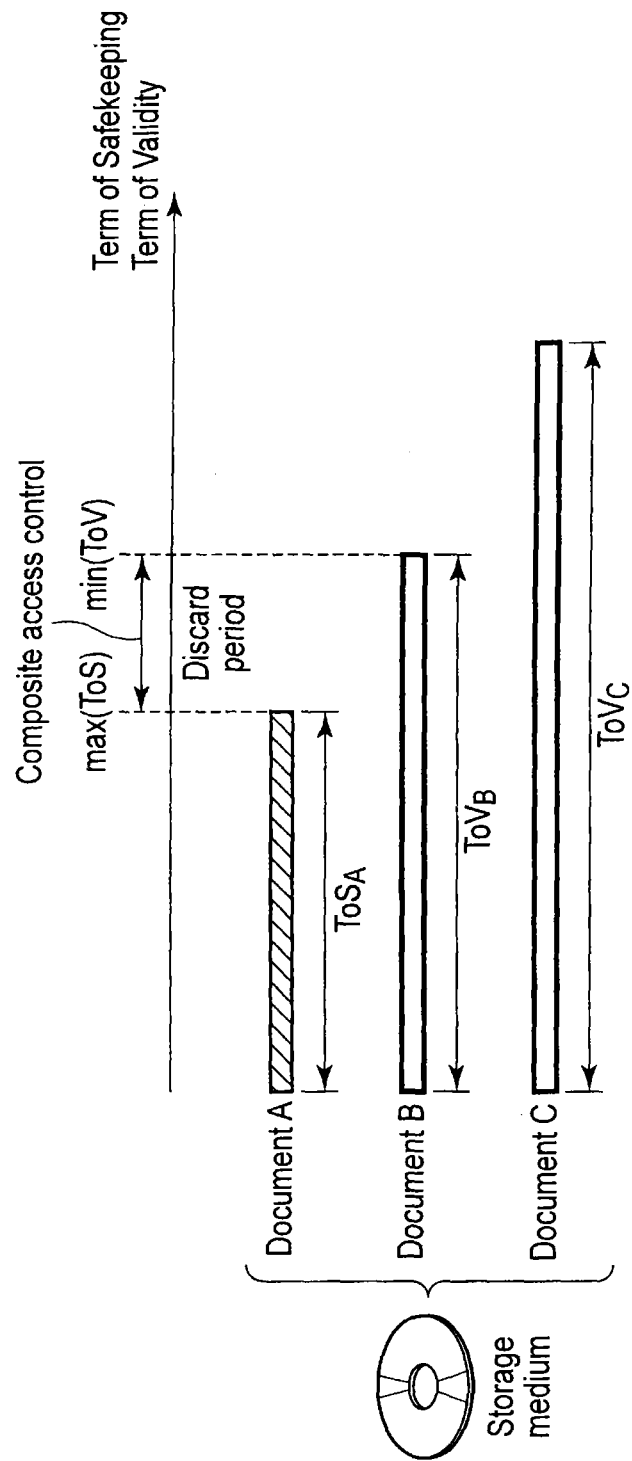
F I G. 21

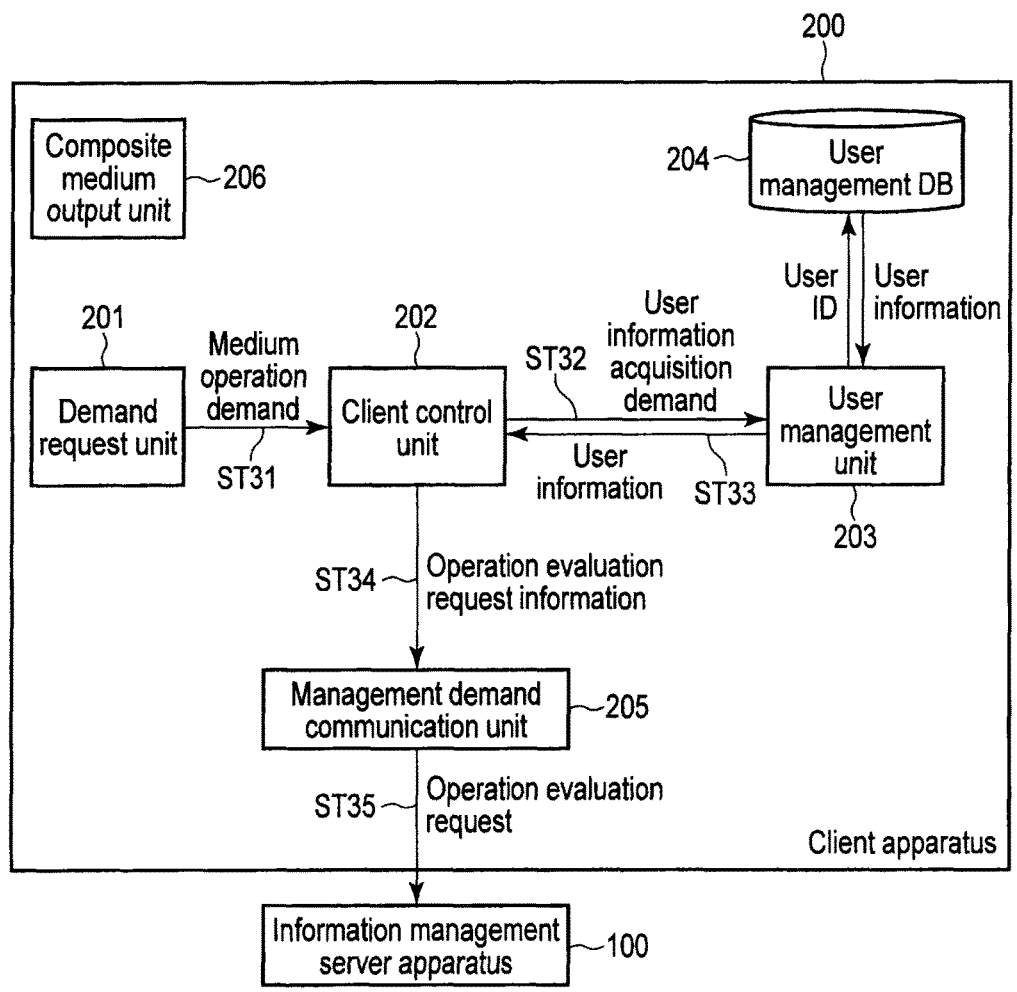
F I G. 24

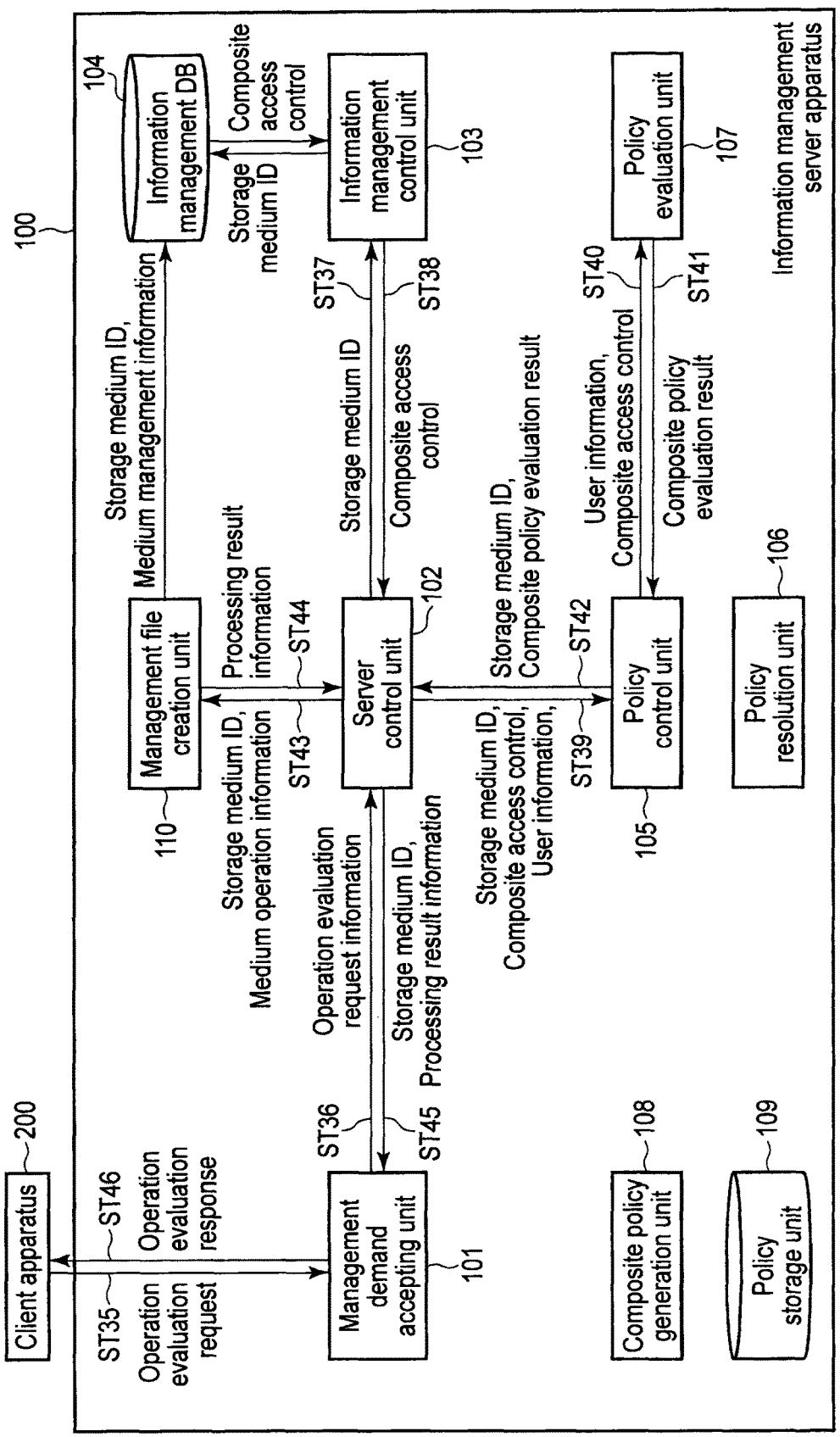
F I G. 25

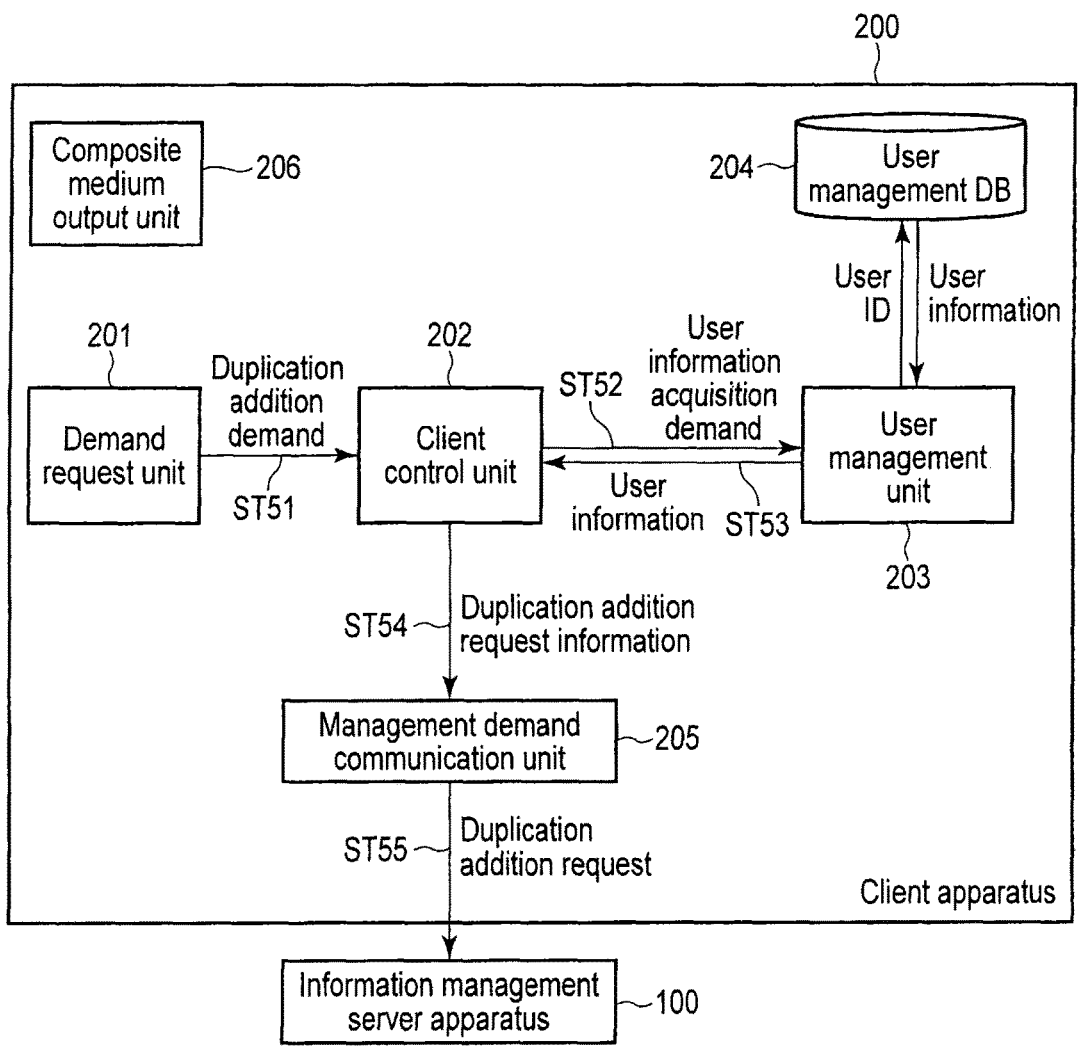
F I G. 29

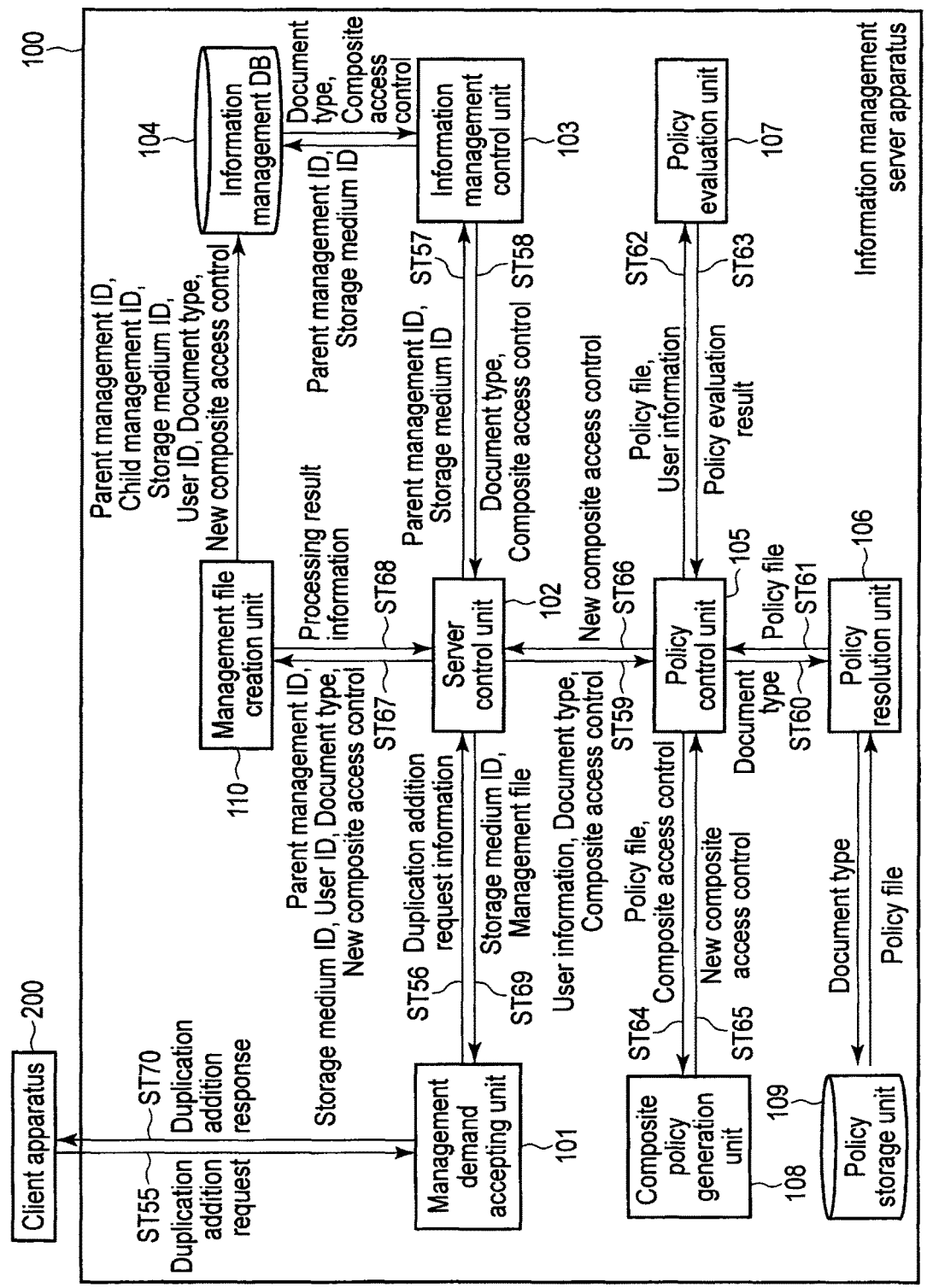
F I G. 30

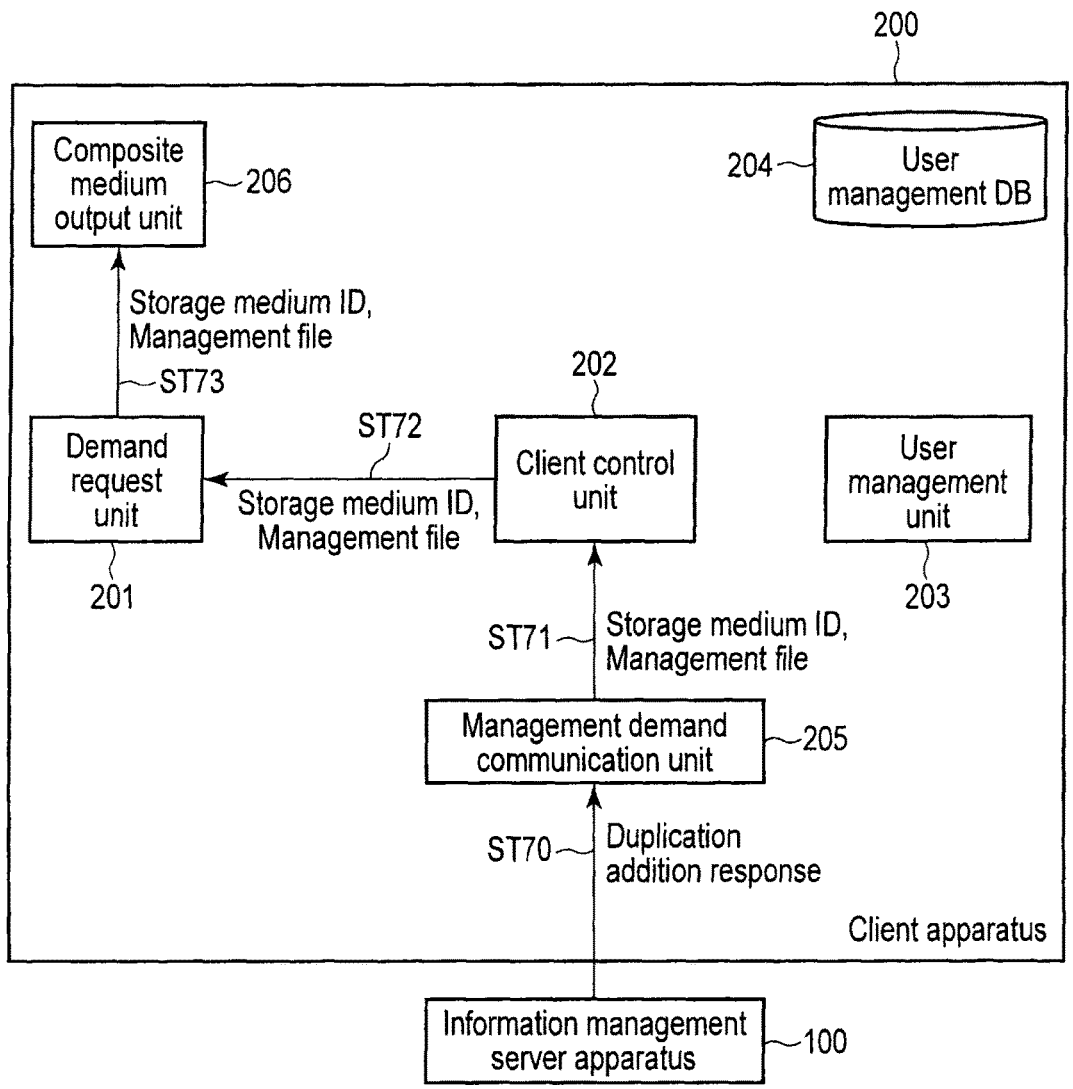
F I G. 31

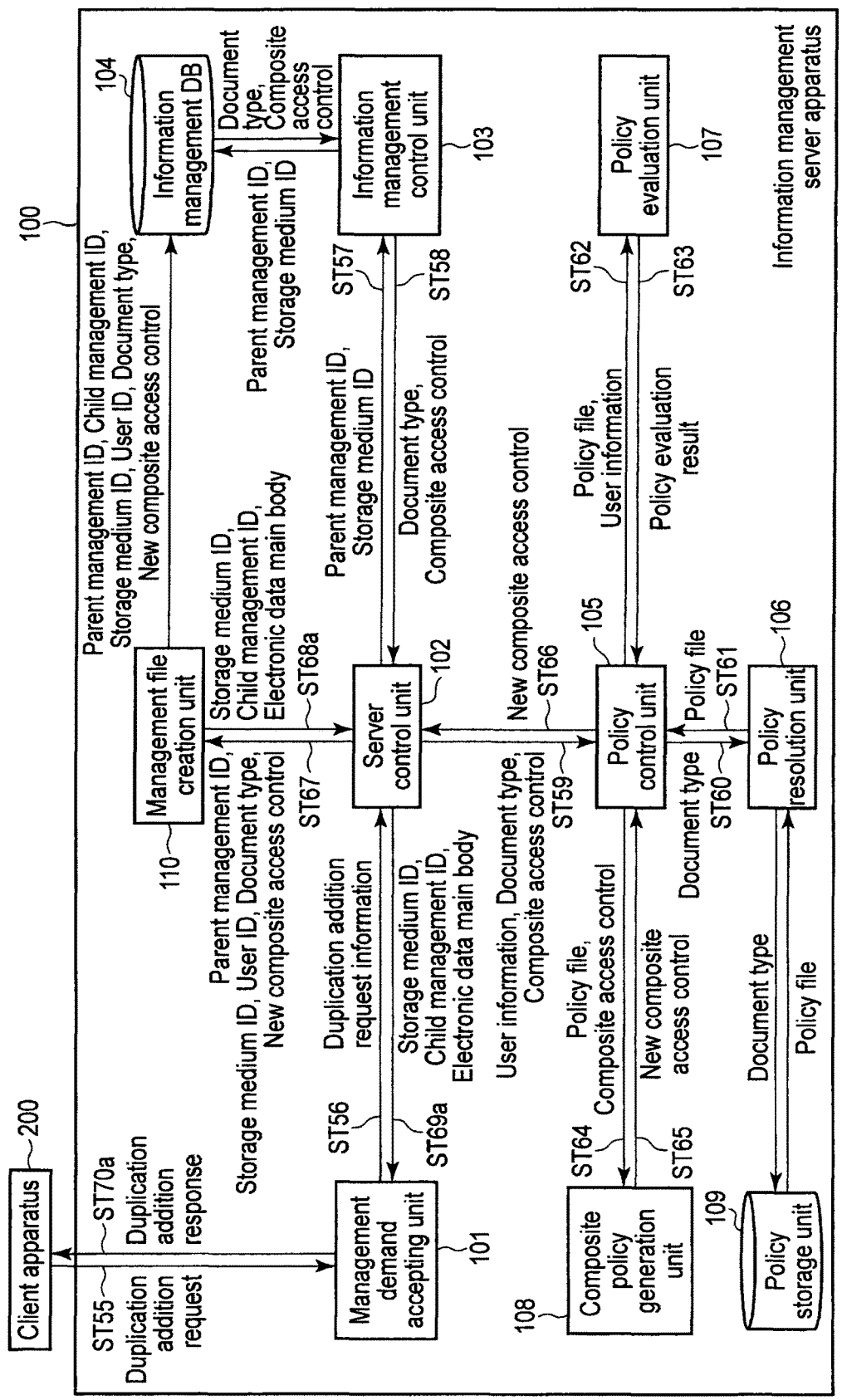
F I G. 32

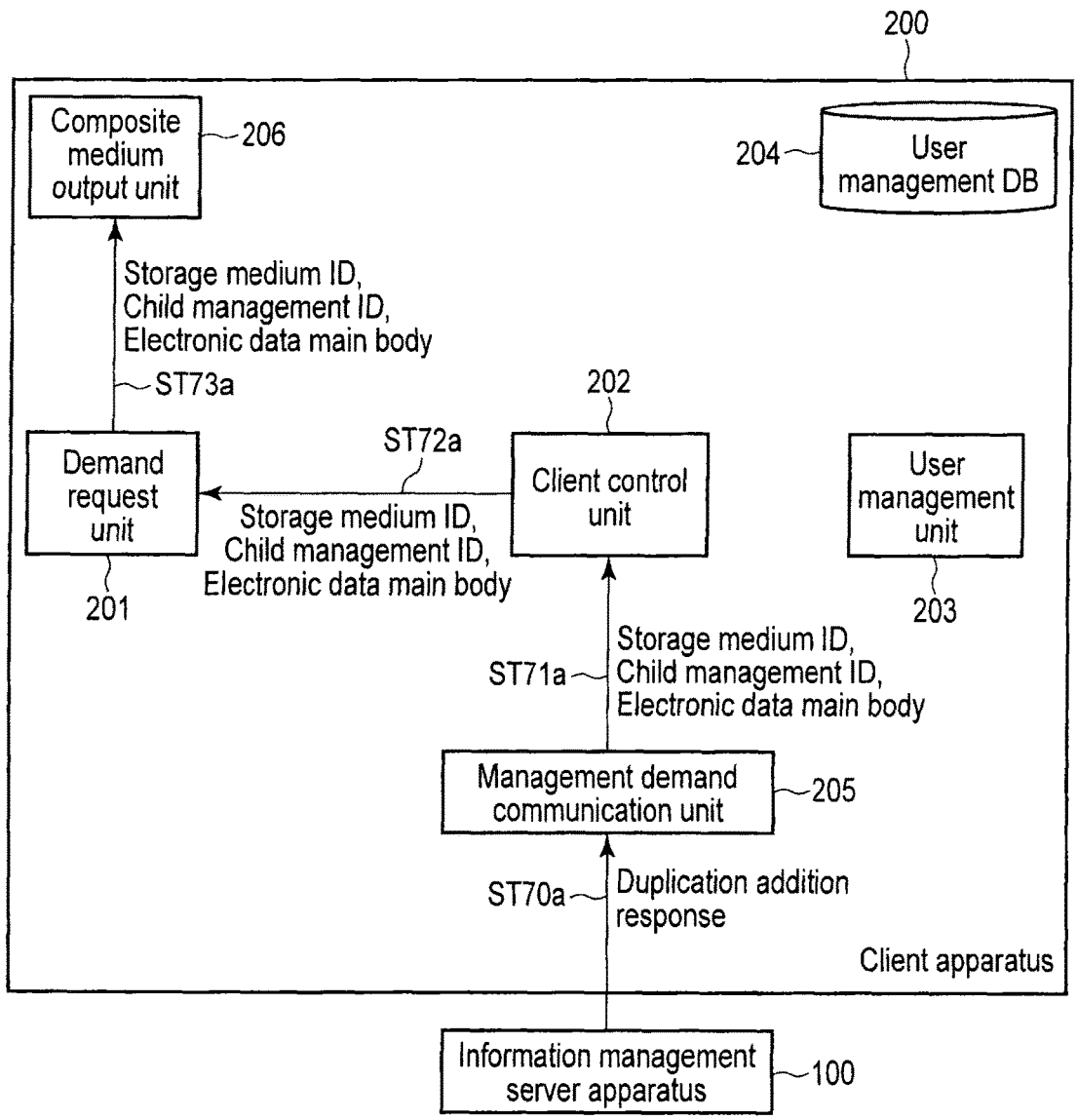
F I G. 33

COMPOSITE MEDIUM MANAGEMENT SYSTEM, INFORMATION MANAGEMENT SERVER APPARATUS, COMPOSITE ACCESS CONTROL CREATION APPARATUS, AND PROGRAM

CROSS-REFERENCE TO RELATED APPLICATIONS

This is a Continuation application of PCT application No. PCT/JP2013/052405, filed on Feb. 1, 2013, which was published under PCT Article 21(2) in Japanese.

This application is based upon and claims the benefit of priority from Japanese Patent Application No. 2012-074579, filed on Mar. 28, 2012; the entire contents of which are incorporated herein by reference.

FIELD

Embodiments described herein relate generally to a composite medium management system, an information management server apparatus, a composite access control creation apparatus, and a program.

BACKGROUND

In general, a plurality of electronic data or papers including a plurality of documents may have different management rules that define the term of validity, takeout range, and authority to view. These electronic data may be replicated to one DVD. Similarly, these papers may be bound in one paper binder. That is, the plurality of electronic data or papers having different management rules may be stored in a single medium such as a DVD or a document binder, thereby managing the plurality of documents. In this case, the single medium needs to be managed without violating any of the management rules of the stored documents.

Conventional techniques about general access right management include DRM (Digital Rights Management) and IRM (Information Rights Management), which attach a security policy to a single piece of electronic data and control enable/disable of various operations for the electronic data.

There is also known a technique of storing a common policy for each combination of folders or documents and evaluating enable/disable of an operation for a plurality of documents having different policies.

Further known is a technique of automatically setting the term of safekeeping of an electronic filing document by associating the term of safekeeping of associated laws and regulations for each document type. In this technique, when a plurality of terms of safekeeping are set for a certain document type in association with a plurality of laws and regulations, the longest term of safekeeping is selected.

In the above-described techniques, however, when storing a plurality of documents having different management rules in a single medium, the management rules of the medium, which do not violate the management rules of each document, cannot be created from the management rules of each document.

According to the examinations of the present inventor, in general, a technique of solving such a problem is considered to be applicable to any case where composite management rules which do not violate the management rules of each management target should be created from the management rules of each management target as well as a case where documents are stored in a single medium.

A solution to such problem of the present invention is to provide a composite medium management system, an information management server apparatus, and a program which can, when storing a plurality of documents having different management rules in a single medium, create the management rules of the medium, which do not violate the management rules, from the management rules.

Another solution to such problem of the present invention is to provide a composite access control creation apparatus and a program which can create composite management rules, which do not violate the management rules of each management target, from the management rules of each management target.

BRIEF DESCRIPTION OF THE DRAWINGS

FIG. 1 is a schematic view showing the arrangement of a composite medium management system according to each embodiment.

FIG. 2 is a schematic view showing a modification of each embodiment.

FIG. 3 is a schematic view showing another modification of each embodiment.

FIG. 5 is a schematic view showing the arrangement of a composite medium management system according to the first embodiment.

FIG. 7 is a schematic view showing the arrangement of a system management table according to the embodiment.

FIG. 8 is a schematic view showing the arrangement of a composite medium management table according to the embodiment.

FIG. 9 is a schematic view showing the arrangement of a client management table according to the embodiment.

FIG. 10 is a schematic view showing the arrangement of a data original management table according to the embodiment.

FIG. 11 is a schematic view showing an example of the arrangement of a policy storage unit according to the embodiment.

FIG. 12 is a view showing an example of the data structure example of a document attribute conversion profile according to the embodiment.

FIG. 13 is a view showing an example of the data structure of a policy reference file according to the embodiment.

FIG. 15 is a schematic view for explaining an operation according to the embodiment.

FIG. 16 is a schematic view for explaining an operation according to the embodiment.

FIG. 17 is a schematic view for explaining an operation according to the embodiment.

FIG. 20 is a schematic view for explaining a term of validity and a composite access control according to the embodiment.

FIG. 21 is a schematic view for explaining a discard period and a composite access control according to the embodiment.

FIG. 24 is a schematic view for explaining an operation according to the embodiment.

FIG. 25 is a schematic view for explaining an operation according to the embodiment.

FIG. 29 is a schematic view for explaining the operation of a composite medium management system according to the third embodiment.

FIG. 30 is a schematic view for explaining an operation according to the embodiment.

FIG. 31 is a schematic view for explaining an operation according to the embodiment.

FIG. 32 is a schematic view for explaining the operation of a composite medium management system according to the fourth embodiment.

FIG. 33 is a schematic view for explaining an operation according to the embodiment.

DETAILED DESCRIPTION

Figure 4:
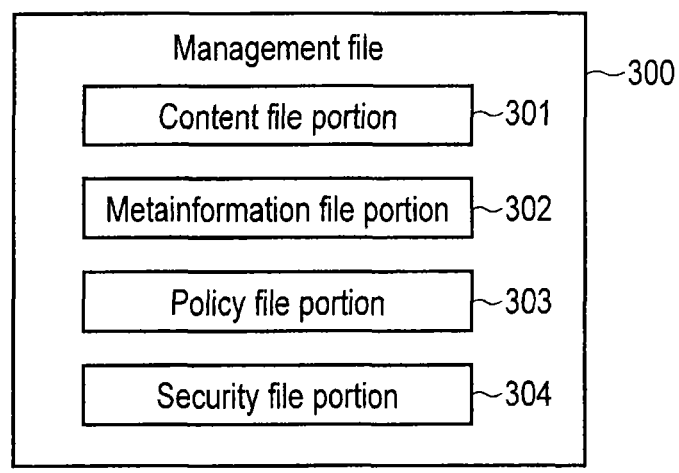
FIG. 4 is a schematic view showing an example of the arrangement of a management file according to each embodiment.

In general, according to one embodiment, a composite medium management system includes an information management server apparatus and a client apparatus which can communicate with each other.

The information management server apparatus comprises a first storage unit, a second storage unit, a third storage unit, and a fourth storage unit.

The first storage unit stores a data original management table in which an entity ID serving as a management ID of original data and an electronic data main body of the original data are written in association with each other.

The second storage unit stores a system management table in which the management ID of duplicated data sequentially duplicated from the original data, a parent management ID representing the management ID of one of the duplicated data and the original data of a duplication source of the duplicated data, a document type of the duplicated data, and a storage medium ID of a composite medium that stores the duplicated data are written in association with each other.

The third storage unit stores a composite medium management table in which the storage medium ID, the management ID added to the duplicated data stored in the composite medium, and composite access control representing one of a discard period and a takeout range of the composite medium and information representing a viewable user are written in association with each other.

The fourth storage unit stores a policy file that defines management rules including an access control representing one of a term of management and the takeout range of the composite medium and the information representing the viewable user for each document type.

Upon receiving a medium storage request including at least one parent management ID indicating at least one duplication target and user information including a user authority of a duplication request source from the client apparatus, the information management server apparatus reads out at least one document type from the system management table based on the at least one parent management ID in the medium storage request.

The information management server apparatus reads at least one policy file from the fourth storage unit based on the at least one readout document type.

The information management server apparatus evaluates, based on the at least one readout policy file and the user information in the medium storage request, whether medium storage responding to the medium storage request is possible.

Upon evaluating that the medium storage is possible, the information management server apparatus creates the composite access control which do not violate any management rules included in the at least one policy file.

The information management server apparatus sends a creation demand including the at least one parent management ID in the medium storage request, the readout document type, and the created composite access control.

Upon receiving the creation demand, the information management server apparatus searches the system management table for a most significant parent management ID based on the management ID represented by the parent management ID in the creation demand, reads out the electronic data main body from the data original management table based on the management ID represented by the found parent management ID, and creates a management file by adding a new management ID to the duplicated data generated by duplicating the electronic data main body.

The information management server apparatus creates the storage medium ID of the composite medium that stores the created management file.

The information management server apparatus updates the system management table so as to write the added management ID, the parent management ID and the document type in the creation demand, and the created storage medium ID in association with each other.

The information management server apparatus updates the composite medium management table so as to write the created storage medium ID, the added management ID, and the composite access control in the creation demand in association with each other.

The information management server apparatus transmits a medium storage response including the created storage medium ID and the management file to the client apparatus.

The client apparatus transmits the medium storage request to the information management server apparatus.

The client apparatus extracts the storage medium ID and the management file from the medium storage response received from the information management server apparatus and sends the storage medium ID and the management file.

Each embodiment will now be described with reference to the accompanying drawings. Note that each of the following apparatuses can be implemented by either a hardware arrangement or a combined arrangement of a hardware resource and software. As the software of the combined arrangement, programs are used, which are installed in computers in advance from a network or non-transitory computer-readable storage media M and M1 to Mm and executed by the processors of the computers, thereby causing the computers to implement the functions of apparatuses $100$ and $201_1$ to $201_m$, as shown in FIG. 1.

Terms, outlines, and the like as the premises of a composite medium management system in this specification will be described first. FIG. 1 is a schematic view showing the arrangement of a composite medium management system according to each embodiment.

This composite medium management system is configured so as to allow the information management server apparatus 100 configured to collectively manage information media and the plurality of client apparatuses $200_1$ to $200_m$ configured to use the collectively managed information media to communicate with each other.

An arbitrary client apparatus out of the client apparatuses $200_1$ to $200_m$ will be referred to as the "client apparatus 200". For descriptive convenience, the one information management server apparatus 100 and the m client apparatuses $200_1$ to $200_m$ will be explained as separate apparatuses. However, the present invention is not limited to this, and one arbitrary client apparatus 200 may include the information management server apparatus 100, as shown in FIG. 2.

As shown in FIG. 3, an arbitrary number i ($2 \leq i \leq m$) of client apparatuses 200 may share execution of n ($i \leq n$) functions of the information management server apparatus 100. In the modification shown in FIG. 3, each of the i client apparatuses 200 may share one function of the information management server apparatus 100 (when i=n). Alternatively, at least one of the i client apparatuses 200 may share two or more functions of the information management server apparatus 100 (when i<n). When distributively arranging the information management server apparatus 100 in which F (F<n) functional blocks (for example, units 101 to 106 in FIG. 5) have n functions, the i client apparatuses 200 may share the F functional blocks, respectively (however, i≤F). Note that in the case where i=F or i<F, "functions" in the above-described case where i=n or i<n is replaced with "functional blocks". To sum up, FIG. 3 shows that the i client apparatuses 200 can share the n functions or F functional blocks of the information management server apparatus 100 based on the relationship $2 \leq i \leq F < n$.

The term "information medium" means a medium having information, and includes electronic data and physical media (paper medium, recording medium, or the like). As a recording medium, for example, a CD-ROM, DVD, SD card, FD, or the like is usable. Accordingly, the client apparatuses $200_1$ to $200_m$ can be implemented as long as they are apparatuses capable of inputting electronic data. The client apparatuses are implemented as various apparatuses such as a mobile phone, PC (Personal Computer), Multi-Function Peripheral, printer, duplicating machine/scanner, shredder, microfilm reader, DVD player, and multidrive in accordance with, for example, the information medium to be used, and operate in cooperation with the information management server apparatus 100.

This composite medium management system provides a unique management ID (IDentification) used to individually identify the above-described information medium and collectively manages information medium creation/discard, mutual relationship (system or medium type), and situations concerning medium use in association with information originals based on the management ID.

When the information medium is electronic data, the composite medium management system converts the electronic data into an electronic file in a file format including the management ID. The electronic file after the conversion will be referred to as a management file.

A management file 300 includes header information including the management ID and attribute information, access control policy, and authentication information for the management file in addition to an electronic data main body of target information. As shown in FIG. 4 illustrating an arrangement example, the management file 300 includes a content file portion 301, a metainformation file portion 302, a policy file portion 303, and a security file portion 304.

The content file portion 301 stores the electronic data itself or encrypted data generated by encrypting the electronic data.

The metainformation file portion 302 includes the management ID, file format version, generation number, medium type, file information, and information management server information of the electronic data. However, the arrangement of the metainformation file portion 302 is not limited to this.

The generation number is a generation value representing the generation of the management file 300 in a system relationship managed as the parent, child, or grandchild counting from the management file 300 registered in the management system for the first time. For example, when the generation number of the management file 300 corresponding to the parent is 1, the generation number of a child information medium corresponding to a duplication of the file is 2, and the generation number of a grandchild information medium corresponding to a duplication of the child information medium is 3. However, the generation number expression format is not limited to this.

The file information includes the file format and file size of the electronic data, and the creator information, creation date/time information, and creation location information of the electronic data.

The information management server information is information used to verify the MAC address, IP address, URI, and authentication data portion of the information management server. As the information used to verify the authentication data portion, cryptographic key information or a certificate of cryptographic key may be stored.

The policy file portion 303 stores access control policy information concerning access control, which describes permitted or prohibited processing of the electronic data for the use conditions of the electronic data, such as the term of validity of the electronic data, disclosure range information representing a place/organization or the like where the data is usable, a network environment, user or usable device information, and use count.

The security file portion 304 stores authentication data information generated by causing the information management server apparatus 100 to perform cryptographic processing for the content file portion 301, the metainformation file portion 302, and the policy file portion 303. As the authentication data information, a digital signature using public key cryptosystem such as DSA (Digital Signature Algorithm), RSA (Rivest-Shamir-Adleman Scheme), or ECDSA (Elliptic Curve DSA) or a MAC (Message Authentication Code) using a hash function or symmetric key cryptosystem is usable.

Terms, outlines, and the like as the premises of the system in this specification have been described above. The name "composite medium management system" indicating the system can be changed as needed to, for example, an "information life cycle management system" or an "information asset management system". Further, "Information", "document", and "material" in names are interchangeable. The embodiments of the composite medium management system will sequentially be described below.

First Embodiment

FIG. 5 is a schematic view showing the arrangement of a composite medium management system according to the first embodiment. FIG. 5 illustrates one information management server apparatus 100 and an arbitrary one client apparatus 200 out of the arrangement shown in FIG. 1.

The information management server apparatus 100 includes a management demand accepting unit 101, a server control unit 102, an information management control unit 103, an information management DB 104, a policy control unit 105, a policy resolution unit 106, a policy evaluation unit 107, a composite policy generation unit 108, a policy storage unit 109, and a management file creation unit 110.

Note that the units may be integrated or omitted as needed when, for example, directly transmitting received information. For example, the management demand accepting unit 101 may be integrated or omitted when, for example, directly transmitting received information. Integrating or omitting the units as needed when, for example, directly transmitting received information also applies to the other apparatuses and following embodiments.

The management demand accepting unit 101, the server control unit 102, the information management control unit 103, the policy control unit 105, the policy resolution unit 106, the policy evaluation unit 107, the composite policy generation unit 108, and the management file creation unit 110 are functional blocks implemented by, for example, causing a CPU (not shown) to execute a program including the steps of the information management server apparatus 100 (to be described later).

The program including the steps of the information management server apparatus 100 need only implement, for example, following functions (a1) to (a7). Here, arbitrary additional items such as various kinds of information and the functions of steps are added to the functions (a1) to (a7) upon request. However, the following functions (a1) to (a7) are representative examples and include arbitrary additional items to some extent.

(a1) Function of writing, in the information management DB 104, a system management table 1041 in which a parent management ID associated with a management ID, medium type, storage medium ID, management state, and access control are written for each management ID of the management file.

(a2) Function of writing, in the information management DB 104, a composite medium management table 1042 in which the management ID, medium type, management state, and composite access control of the management file stored in the medium are written for each storage medium ID.

(a3) Evaluation function of evaluating whether a medium storage request received from the client apparatus 200 meets a policy file in the policy storage unit 109 corresponding to the document type of a management ID designated in the medium storage request information.

(a4) Function of, when the policy file is met as the result of evaluation by the evaluation function, creating composite access control from policy files corresponding to the document type and access control corresponding to a composite medium ID.

(a5) Function of, when the policy file is met as the result of evaluation by the evaluation function, issuing a child management ID different from the management ID in the received medium storage request information and writing it in the system management table 1041 in association with the management ID of original data selected as the source material of the duplicate or the parent management ID of the duplicate and also issuing a composite medium ID and writing it in the composite medium management table 1042 in association with the issued child management ID.

(a6) Function of creating a management file including the issued child management ID.

(a7) Function of transmitting a medium storage response including the issued management file and storage medium ID to the client apparatus 200 as the transmission source of the medium storage request information.

Note that when the functions of the information management server apparatus 100 are shared among the plurality of client apparatuses 200, as shown in FIG. 3, for example, the following modification is made. That is, out of the client apparatuses, two to seven client apparatuses 200 are used in place of the information management server apparatus 100, and means for implementing the functions (a1) to (a7) of the information management server apparatus 100 are distributively arranged in the two to seven client apparatuses 200. Note that when seven client apparatuses 200 are used, one of the functions (a1) to (a7) is arranged in each of the client apparatuses 200. When two client apparatuses 200 are used, one to six functions of the functions (a1) to (a7) are arranged in one client apparatus 200, and the remaining function is arranged in the other client apparatus 200. When three to six client apparatuses 200 are used, the functions (a1) to (a7) are similarly distributively arranged in the client apparatuses 200.

Figure 6:
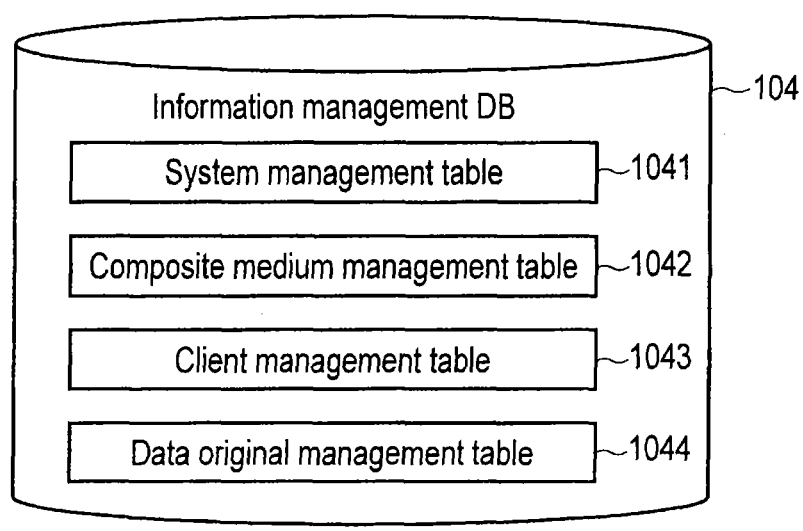
FIG. 6 is a schematic view showing the arrangement of an information management DB according to the embodiment.

The information management DB 104 can be implemented as a storage device readable/writable by a CPU (not shown), and stores the system management table 1041, the composite medium management table 1042, a client management table 1043, and a data original management table 1044, as shown in FIG. 6.

In the system management table 1041, the management ID of duplicated data sequentially duplicated from original data, a parent management ID representing the management ID of duplicated data or original data of the duplication source of the duplicated data, the document type of the duplicated data, and the storage medium ID of a composite medium that stores the duplicated data are written in association with each other. Note that a management state representing the in-use state or discarded state of the composite medium having the storage medium ID can further be written in the system management table 1041 in association with the storage medium ID.

For example, the system management table 1041 stores information about a parent management ID and the medium type and document type, storage medium ID, user ID, management state, and access control of the subject managed by the management ID, as shown in FIG. 7.

As the system of issuing management ID, serial numbers may be used as long as the uniqueness in the system is guaranteed, and the parent-child relationship of copies are managed based on the link by the management IDs. Additionally, management IDs having a meaningful configuration may be issued so as to make the parent-child relationship of the management IDs recognizable. To do this, for example, a parent-child relationship value is set in a specific digit.

In the composite medium management table 1042, a storage medium ID, a management ID added to duplicated data stored in a composite medium, and composite access control representing the discard period or takeout range of the composite medium and information representing a viewable user are written in association with each other. For example, the composite medium management table 1042 stores a storage medium ID added to each storage medium such as a DVD that stores one or more management files or a paper binder that binds one or more paper documents to which management IDs are added, the user ID of an administrator, the management ID of stored information, the type of the storage medium, the management state, and the composite access control in association with each other, as shown in FIG. 8. The composite access control are the management rules of the storage medium, which are defined for each document type of the stored management ID and do not violate any security policy. For example, the composite access control include the discard or return period of the medium and the takeout range such as a room or a business establishment.

The client management table 1043 stores a client ID, a user ID, an authorization class, a terminal type, and a MAC address in association with each other, as shown in FIG. 9. The client management table 1043 may also include information about a target client apparatus such as OS information and device management number.

The data original management table 1044 is a table in which an entity ID that is the management ID of original data and the electronic data main body of the original data are written in association with each other. The data original management table 1044 stores an entity ID, a file name, a size, a hash value, an electronic data main body, and external storage information in association with each other, as shown in FIG. 10. The entity ID is identification information of the electronic data main body (data original). The file name is the file name of a management target data main body (electronic data main body) stored in the management file. The size is the file size of the management target data main body stored in the management file. The hash value is the hash value of the management target data main body stored in the management file. The electronic data main body is the management target data main body stored in the management file. External storage information is storage destination information when the management target data main body is stored outside the information management DB 104. When the management target data main body is stored in the information management DB 104, the external storage information is NULL.

The composite policy generation unit 108 is a functional block that creates composite access control from a plurality of policy files. The composite policy generation unit 108 may be provided independently of the information management server apparatus 100 as, for example, a composite access control creation apparatus including a memory. In this case, the composite access control creation apparatus can be used not only for composite medium management but also for arbitrary information management. The composite access control creation apparatus can be implemented by either a hardware arrangement or a combination of a hardware resource and software, as described above. As the software of the combined arrangement, a program is used, which is installed in the computer in advance from the network or a storage medium to implement the functions of the composite access control creation apparatus. The composite policy generation unit 108 may be provided as a portion of an arbitrary information management apparatus that uses no composite medium.

The composite policy generation unit 108 has, for example, following functions (f108-1) to (f108-3).

(f108-1) Function of writing a plurality of policy files in a memory (not shown) when the plurality of policy files that define management rules including an access control representing the term of management or takeout range and information representing a viewable user for each type of a plurality of pieces of management target information are input.

(f108-2) Creation function of creating composite access control which do not violate any management rules included in the plurality of policy files in the memory.

(f108-3) Function of outputting the created composite access control.

The creation function (f108-2) may include the following functions (f108-2-1) to (f108-2-7).

(f108-2-1) Function of extracting the shortest term of validity out of all terms of management included in the plurality of policy files in the memory.

(f108-2-2) Function of extracting the longest term of safekeeping out of all terms of management included in the plurality of policy files in the memory.

(f108-2-3) Function of creating a discard period representing a period equal to or more than the longest term of safekeeping and equal to or less than the shortest term of validity.

(f108-2-4) Function of selecting the discard period when the discard period is created or selecting the extracted term of validity or term of safekeeping when the discard period is not created.

(f108-2-5) Function of extracting the narrowest takeout range out of all takeout ranges included in the plurality of policy files in the memory.

(f108-2-6) Function of extracting the user authority in the narrowest range out of all user authorities included in the plurality of policy files in the memory.

(f108-2-7) Function of creating composite access control including the selected discard period, term of validity, or term of safekeeping, the extracted takeout range, and the extracted user authority.

The creation function (f108-2) may also include the following function (f108-2-8).

(f108-2-8) Function of outputting error information without creating composite access control when the shortest term of validity is shorter than the longest term of safekeeping.

Even when not only a plurality of policy files but a plurality of policy files and composite access control are input, the composite policy generation unit 108 can create new composite access control which do not violate any management rules included in the plurality of policy files and composite access control.

The policy storage unit 109 stores policy files $1093_1$ to $1093_n$ that define management rules including an access control representing the term of management or takeout range of a composite medium and information representing a viewable user for each document type, as shown in FIG. 11. The term of management here means one or both of the term of safekeeping and the term of validity (to be described later). In the following explanation, the policy files $1093_1$ to $1093_n$ will also simply be referred to as policy files 1093.

The policy storage unit 109 stores a document attribute conversion profile 1091 and a policy reference file 1092, as shown in FIGS. 12 and 13, in addition to the policy files 1093.

The client apparatus 200 includes a demand request unit 201, a client control unit 202, a user management unit 203, a user management DB 204, a management demand communication unit 205, and a composite medium output unit 206.

The demand request unit 201 has a function of sending a medium storage demand including a user ID as the subject of a duplication operation, the management ID of information as a duplication target, and the type of the storage medium to the client control unit 202, a function of causing the information management server apparatus 100 to acquire the storage medium ID and the management file, and a function of outputting the acquired storage medium ID and management file to the composite medium output unit 206.

The client control unit 202 has a function of receiving the medium storage demand from the demand request unit 201 and demanding user information from the user management unit 203 while designating a user ID, a function of creating medium storage request information including the medium storage demand from the demand request unit 201 and the user information from the user management unit 203 and transmitting it to the management demand communication unit 205, and a function of receiving, from the management demand communication unit 205, a storage medium ID and a management file issued by the information management server apparatus 100 and transmitting them to the demand request unit 201.

The user management unit 203 has a function of receiving user information acquisition demand including a user ID from the client control unit 202, querying the user management DB 204 about the user ID, acquiring corresponding user information, and transmitting it to the client control unit 202.

Figure 14:
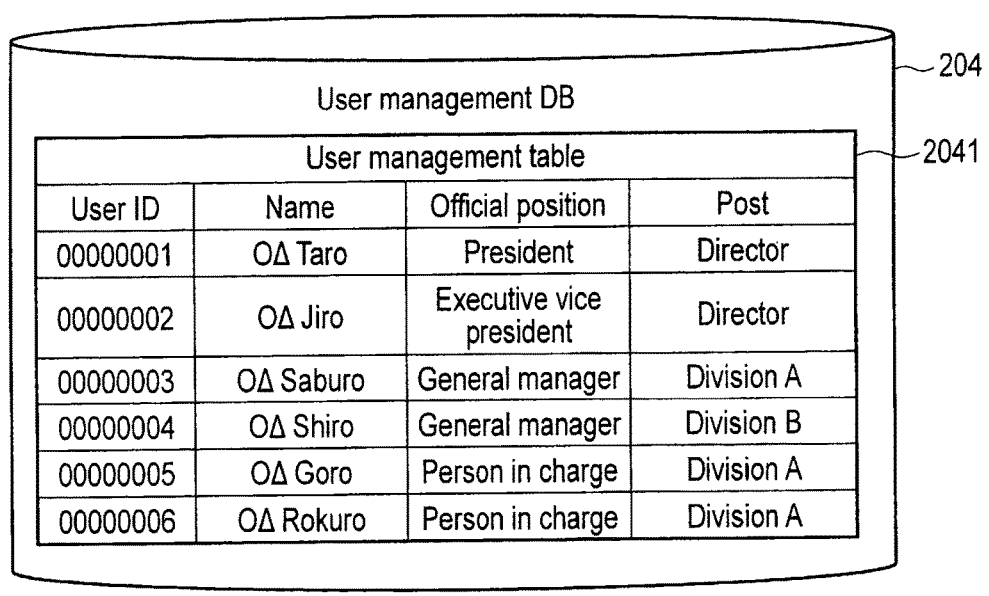
FIG. 14 is a schematic view showing the arrangement of a user management table according to the embodiment.

The user management DB 204 can be implemented as a storage device readable/writable from a CPU (not shown), and stores a user management table 2041, as shown in FIG. 14.

The user management table 2041 stores a name, an official position, and a post in association with each other for each user ID.

The management demand communication unit 205 has a function of receiving medium storage request information from the client control unit 202 and transmitting the medium storage request to the information management server apparatus 100, and a function of transmitting a storage medium ID and a management file included in a medium storage response received from the information management server apparatus 100 to the client control unit 202.

The composite medium output unit 206 has a function of acquiring a storage medium ID and a management file from the demand request unit 201, a function of pasting the storage medium ID to a composite medium, and a function of recording the management file in the composite medium. For example, in the function of pasting the storage medium ID to the composite medium, the storage medium ID is encoded as a QR Code™ and printed on the label surface of a composite medium such as a DVD or a CD.

The operation of the composite medium management system having the above-described arrangement will be described next with reference to the schematic views of FIGS. 15 to 17. The following explanation will be made concerning an operation of designating the management IDs of a plurality of documents, acquiring the management files and storage medium IDs of the management IDs, and storing the management files and storage medium IDs in a new composite medium.

A general operation will be described first.

[General Operation of Storing Electronic Data in New Composite Medium]

The client apparatus 200 transmits a medium storage request including at least one parent management ID indicating at least one duplication target and user information including the user authority of the duplication request source to the information management server apparatus 100.

Upon receiving the medium storage request from the client apparatus 200, the information management server apparatus 100 reads out at least one document type from the system management table 1041 based on the at least one parent management ID in the medium storage request.

The information management server apparatus 100 reads out at least one policy file from the policy storage unit 109 based on the at least one readout document type.

The information management server apparatus 100 evaluates, based on the at least one readout policy file and the user information in the medium storage request, whether medium storage responding to the medium storage request is possible.

Upon evaluating that the medium storage is possible, the information management server apparatus 100 creates composite access control which do not violate any management rules included in the at least one policy file.

The information management server apparatus 100 sends a creation demand including the at least one parent management ID in the medium storage request, the readout document type, and the created composite access control. Upon receiving the creation demand, the system management table 1041 is searched for the most significant parent management ID based on the management ID represented by the parent management ID in the creation demand. Electronic data main body is read out from the data original management table 1044 based on the management ID represented by the found parent management ID. A new management ID is added to duplicated data generated by duplicating the electronic data main body, thereby creating a management file.

The information management server apparatus 100 creates the storage medium ID of a composite medium that stores the created management file.

The information management server apparatus 100 updates the system management table 1041 so as to write the added management ID, the parent management ID and document type in the creation demand, and the created storage medium ID in association with each other.

The information management server apparatus 100 updates the composite medium management table 1042 so as to write the created storage medium ID, the added management ID, and the composite access control in the creation demand in association with each other.

The information management server apparatus 100 transmits a medium storage response including the created storage medium ID and management file to the client apparatus 200.

The client apparatus 200 extracts the storage medium ID and the management file from the medium storage response received from the information management server apparatus 100, and sends the storage medium ID and the management file.

Note that the client apparatus 200 may print the sent storage medium ID on a label sheet to be pasted onto the composite medium. The client apparatus 200 may write the sent management file in the composite medium.

Such a storage operation will be described next in detail.

[Detailed Operation of Storing Electronic Data in New Composite Medium]

The demand request unit 201 of the client apparatus 200 transmits a medium storage demand including the management ID of a document to be stored in a medium, the storage medium type, the user ID of the request source, and the user ID of the administrator of the storage medium to the client control unit 202 (ST1).

Upon receiving the medium storage demand, the client control unit 202 extracts the user ID of the request source and the user ID of the administrator of the storage medium from the medium storage demand, and sends a user information acquisition demand including the user IDs to the user management unit 203 (ST2).

Upon receiving the user information acquisition demand, the user management unit 203 extracts the user IDs from the user information acquisition demand, acquires user information corresponding to the user IDs by querying the user management DB, and transmits it to the client control unit 202 (ST3).

Upon acquiring the user information from the user management unit 203, the client control unit 202 transmits medium storage request information including the management ID, the storage medium type, and user IDs in the medium storage demand received in step ST2, and the acquired user information to the management demand communication unit 205 (ST4).

Upon receiving the medium storage request information, the management demand communication unit 205 transmits a medium storage request including the medium storage request information to the information management server apparatus 100 (ST5).

Upon receiving the medium storage request from the client apparatus 200, the management demand accepting unit 101 of the information management server apparatus 100 transmits the medium storage request information included in the medium storage request to the server control unit 102 (ST6).

Upon receiving the medium storage request information, the server control unit 102 transmits the management ID (to be referred to as a parent management ID hereinafter) included in the medium storage request information to the information management control unit 103 and demands the document type of the parent management ID (ST7).

Upon receiving at least one parent management ID from the server control unit 102, the information management control unit 103 acquires the document type of the parent management ID by querying the information management DB 104, and transmits the set of the parent management ID and the document type to the server control unit 102 (ST8). When a plurality of parent management IDs are designated, the information management control unit 103 queries the information management DB about the designated number of corresponding document types and transmits them to the server control unit 102. At this time, if different parent management IDs correspond to the same document type, it is unnecessary to transmit as many document types as parent management IDs, and transmitting one document type suffices.

Upon receiving the parent management ID and the document type from the information management control unit 103, the server control unit 102 transmits the user information included in the medium storage request information received in step ST7 and all document types acquired from the information management control unit 103 to the policy control unit 105 (ST9).

Upon receiving the document type and the user information from the server control unit 102, the policy control unit 105 transmits a policy file selection demand including the document type to the policy resolution unit 106 (ST10).

Upon receiving the policy file selection demand, the policy resolution unit 106 selects a policy file corresponding to the document type by referring to the document attribute conversion profile 1091 and the policy reference file 1092 in the policy storage unit 109 based on the document type in the policy file selection demand (ST11). FIG. 11 shows an example of data held by policy storage unit 109. The document attribute conversion profile 1091 manages the relationship between a document type and a policy identifier. FIG. 12 shows an example of the data structure of the document attribute conversion profile 1091. In FIG. 12, for example, when the document type is "catalog", a policy designated by a policy identifier "NoPersonal-Commodity" is referred to. The policy reference file 1092 manages the relationship between a policy identifier and the policy file 1093. FIG. 13 shows an example of the data structure of the policy reference file 1092. In FIG. 13, for example, the entity of a policy file having a policy identifier "NoPersonal-Commodity" is "policy-01.xml".

A policy selection operation when the document type is "contract" will be described below.

(a) The policy resolution unit 106 refers to the document attribute conversion profile 1091 from the policy storage unit 109, searches for a policy identifier in which the document type (ResourceReferenceValue Id) corresponds to "contract", and acquires a policy identifier (ResourceTypeId) "Personal-Contract".

(b) The policy resolution unit 106 refers to the policy reference file 1092 from the policy storage unit 109, searches for a policy file (PolicyReferenceId) in which the policy identifier corresponds to "Personal-Contract", and acquires the policy file 1093 "policy-02.xml" that manages "contract".

(c) The policy resolution unit 106 transmits the acquired policy file 1093 "policy-02.xml" to the policy control unit 105 (ST11). In step ST11, the above-described processes (a) to (c) are repeated as many times as the number of designated document types.

The policy control unit 105 acquires as many policy files as the number of designated document types from the policy resolution unit 106, transmits the policy files and the user information received in step ST10 to the policy evaluation unit 107, and demands to determine whether medium storage is enabled (ST12).

Upon receiving the policy files and the user information from the policy control unit 105, the policy evaluation unit 107 evaluates, based on the policy file 1093, whether medium storage is enabled, and transmits the enable/disable evaluation result to the policy control unit 105 (ST13). This processing is executed as many times as the number of policy files.

Upon receiving the enable/disable evaluation result from the policy evaluation unit 107, the policy control unit 105 transmits all policy files to the composite policy generation unit 108 only when all enable/disable evaluation results indicate the enable state, and demands creation of the composite access control of the designated storage medium (ST14). A modification may be made so as to exclude a management ID corresponding to a document type whose enable/disable evaluation result indicates the disable state and store only documents of management IDs determined as enable.

Figure 18:
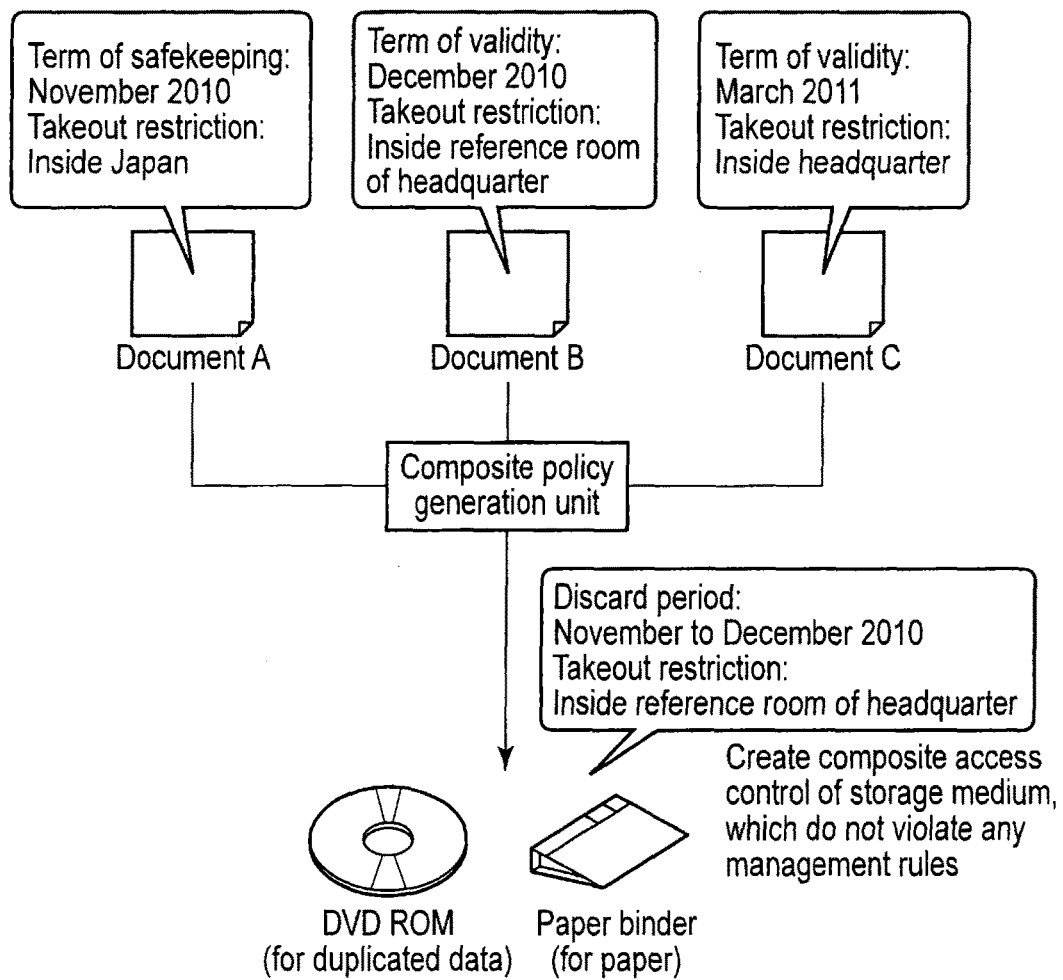
FIG. 18 is a schematic view for explaining composite access control according to the embodiment.

Upon acquiring the policy files from the policy control unit 105, the composite policy generation unit 108 creates access control which do not violate any policy files by mutually referring to the policy files, transmits the obtained composite access control to the policy control unit 105 (ST15). For example, FIG. 18 shows a case where when the policy files of three documents A, B, and C having different management rules are given, access control which do not violate any policy files are calculated based on the strictest term of validity and takeout limitation and set a the composite access control of the storage medium.

Figure 19:
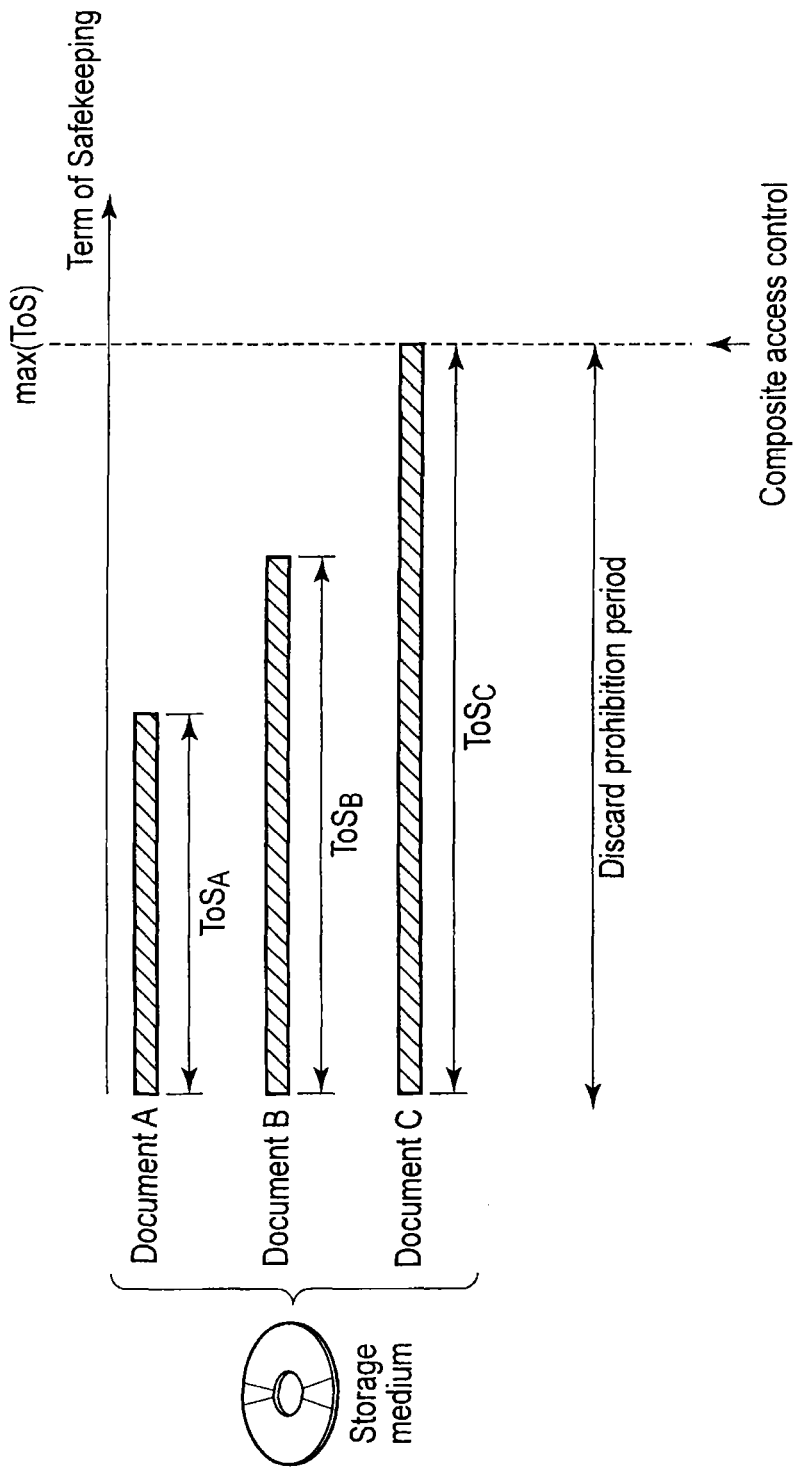
FIG. 19 is a schematic view for explaining a term of safekeeping and a composite access control according to the embodiment.

As temporal limitations, a term of safekeeping and a term of validity are set. The term of safekeeping is an access control concerning time, which prohibits discard of the document before the set date/time. As shown in FIG. 19, let ToSA, ToSB, and ToSC be the terms of safekeeping of the documents A, B, and C, respectively. In this case, the longest term ToSC of safekeeping is set to a term max (ToS) of safekeeping serving as a composite access control which does not violate any limitations. On the other hand, the term of validity is an access control concerning time, which prohibits use of the document beyond the set date/time. As shown in FIG. 20, let ToVA, ToVB, and ToVC be the terms of validity of the documents A, B, and C, respectively. In this case, the shortest term ToVA of validity is set to a term min (ToV) of validity serving as a composite access control which does not violate any limitations. If terms of safekeeping and terms of validity coexist, as shown in FIG. 21, a period sandwiched between ToSA that is the longest value max (ToS) of the term of safekeeping and ToVB that is the shortest value min (ToV) of the term of validity is defined as a discard period, thereby creating a composite access control which does not violate any limitations. If the longest value of the term of safekeeping is smaller than the shortest value of the term of validity, that is, max (ToS)>min (ToV), a composite access control which does not violate any limitations does not exist. The medium storage operation is disabled, and an error is output.

Figure 22:
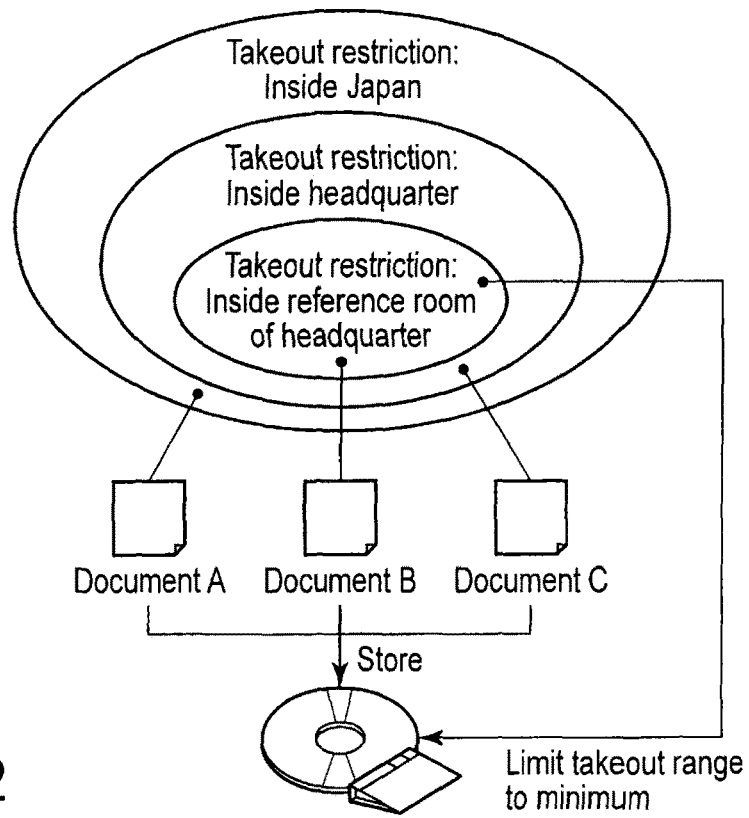
FIG. 22 is a schematic view for explaining a takeout range and a composite access control according to the embodiment.
Figure 23:
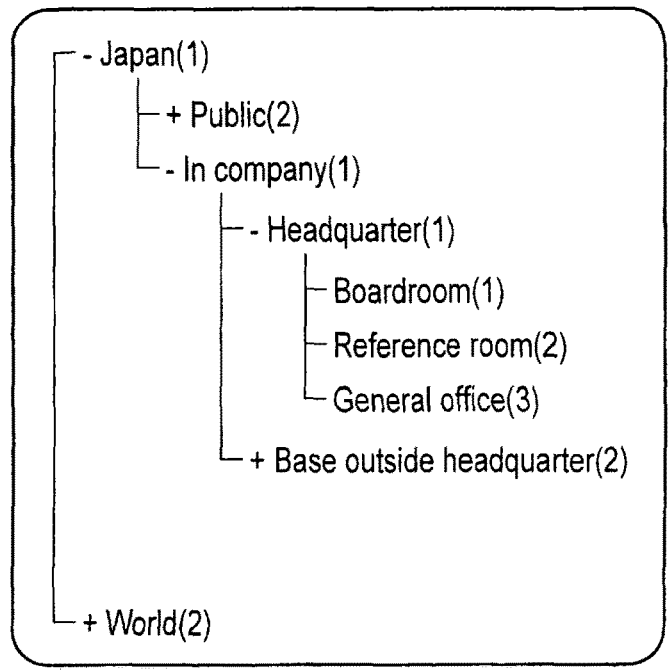
FIG. 23 is a schematic view for explaining a takeout range and a composite access control according to the embodiment.

As a spatial access control, the takeout range is set to the narrowest range, as shown in FIG. 22, to create the access control of the storage medium, thereby obtaining a composite access control which does not violate any access control. As for the standard of the narrowness of the takeout range, the space size relationship may be defined by a hierarchical structure, as shown in FIG. 23. Within the same layer, a space having a smaller numerical value is preferentially set as the composite access control. Note that the spatial access control can have any form as long as it can define the standard or priority of narrowness.

The policy control unit 105 transmits the composite access control acquired from the composite policy generation unit 108 to the server control unit 102 (ST16).

The server control unit 102 transmits the parent management ID, the storage medium type, and the user ID included in the medium storage request information received in step ST7, the document type received in step ST9, and the composite access control acquired from the policy control unit 105 to the management file creation unit 110, and demands creation of a storage medium ID and a management file (ST17).

Upon receiving the parent management ID, the storage medium type, the user ID, the document type, and the composite access control from the server control unit 102, the management file creation unit 110 newly issues a unique management ID as a child management ID, searches the system management table 1041 of the information management DB 104 for a management ID serving as "Root" based on the parent management ID, acquires the electronic data main body of the management ID representing the data original from the data original management table 1044 of the information management DB 104, and creates a management file including the electronic data and the management ID. The management file creation unit 110 also issues a unique storage medium ID.

The management file creation unit 110 stores the parent management ID, the document types, the user ID, and a medium type representing "duplicated data", which are acquired from the server control unit 102, and the issued storage medium ID in the system management table 1041 in association with the issued child management ID.

At this time, the management file creation unit 110 sets the management state to "in use", copies the access control stored in association with the parent management ID, and stores the child management ID of the management file to be stored in the composite medium, the user ID of the administrator of the medium, the medium type, and the composite access control in the composite medium management table 1042 of the information management DB 104 in association with the child management ID. At this time, the management state is stored as "in use".

The management file creation unit 110 sends the issued storage medium ID and the management file to the server control unit 102 (ST18). In place of the access control stored in the system management table 1041 in association with the child management ID, the composite access control of the composite medium that stores the management file including the child management ID may be duplicated.

The server control unit 102 transmits the storage medium ID and the management file acquired from the management file creation unit 110 to the management demand accepting unit 101 (ST19).

The management demand accepting unit 101 transmits a medium storage response including the storage medium ID and the management file to the client apparatus 200 as a response to the medium storage request received in step ST6 (ST20).

The management demand communication unit 205 of the client apparatus 200 transmits the storage medium ID and the management file included in the medium storage response received from the information management server apparatus 100 to the client control unit 202 (ST21).

The client control unit 202 transmits the storage medium ID and the management file to the demand request unit 201 (ST22).

The demand request unit 201 transmits the storage medium ID and the management file to the composite medium output unit 206 (ST23).

The composite medium output unit 206 prints the storage medium ID on the label surface of the composite medium and records the management file in the composite medium.

The composite medium output unit 206 may be provided outside the client apparatus 200. The storage medium ID to be printed on the composite medium may be converted into a code such as a two-dimensional code or a bar code by an optical means and printed. Alternatively, an electronic tag such as an RFID may be pasted. A portion of the composite medium output unit 206 that pastes the storage medium ID onto the composite medium and a portion that records the management file in the composite medium may be separate.

As described above, when the management file is stored in the composite medium to which the storage medium ID is pasted, management of the composite medium which stores the management file whose parent management ID is "ROOT" and does not violate any access control can be implemented.

Figure 26:
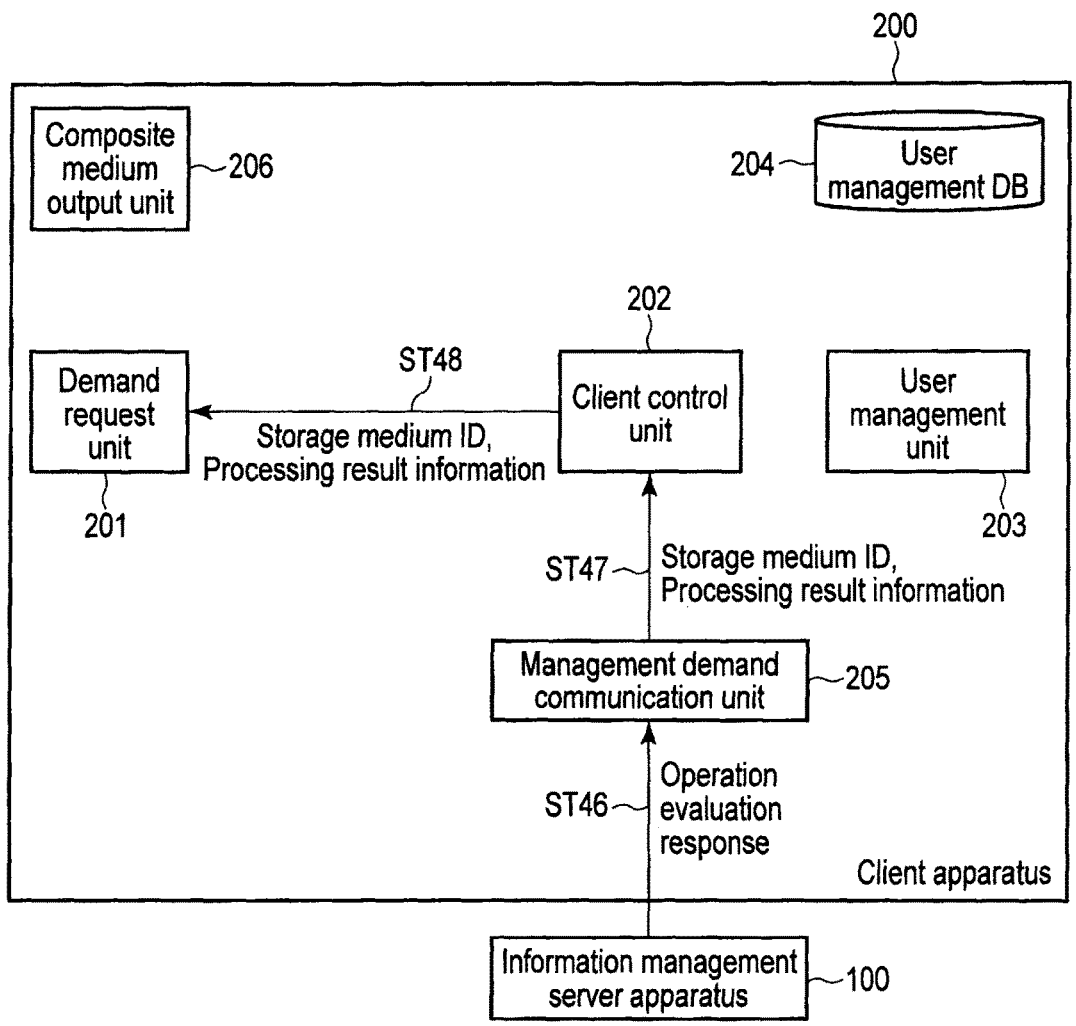
FIG. 26 is a schematic view for explaining an operation according to the embodiment.

An operation of designating a storage medium ID and discarding a storage medium in the composite medium management system having the above-described arrangement will be described next with reference to the schematic views of FIGS. 24 to 26. Note that the operation at the time of discard also applies to the following embodiments.

A general operation will be described first.

[General Operation of Discarding Storage Medium]

The client apparatus 200 transmits a medium discard demand including the storage medium ID of a discard target and user information of the discard request source to the information management server apparatus 100.

Upon receiving the medium discard demand from the client apparatus 200, the information management server apparatus 100 reads out composite access control from the composite medium management table 1042 based on the storage medium ID in the medium discard demand.

The information management server apparatus 100 evaluates, based on the readout composite access control and user information in the medium discard demand, whether discard of a composite medium indicated by the storage medium ID in the medium discard demand is possible.

Upon evaluating that discard is possible, the information management server apparatus 100 writes a management state representing a discarded state in association with the storage medium ID in the system management table 1041 based on the storage medium ID in the medium discard demand.

The information management server apparatus 100 transmits a discard evaluation response including write completion information of the discarded state and the storage medium ID in the medium discard demand to the client apparatus 200.

The client apparatus 200 extracts the storage medium ID and the write completion information of the discarded state from the discard evaluation response received from the information management server apparatus 100 and sends the storage medium ID and the write completion information.

Such a discard operation will be described next in detail.

[Detailed Operation of Discarding Storage Medium]

The demand request unit 201 of the client apparatus 200 transmits a medium operation demand including the storage medium ID of a composite medium to be discarded and the user ID of the request source to the client control unit 202 (ST31).

Upon receiving the medium operation demand, the client control unit 202 extracts the user ID of the request source from the medium operation demand and transmits a user information acquisition demand including the user ID to the user management unit 203 (ST32).

Upon receiving the user information acquisition demand, the user management unit 203 extracts the user ID from the user information acquisition demand, acquires user information corresponding to the user ID by querying the user management DB 204, and transmits it to the client control unit 202 (ST33).

Upon acquiring the user information from the user management unit 203, the client control unit 202 transmits operation evaluation request information including the storage medium ID and user ID in the medium operation demand received in step ST32 and the acquired user information to the management demand communication unit 205 (ST34).

Upon receiving the operation evaluation request information, the management demand communication unit 205 transmits an operation evaluation request including the operation evaluation request information to the information management server apparatus 100 (ST35).

Upon receiving the operation evaluation request from the client apparatus 200, the management demand accepting unit 101 of the information management server apparatus 100 transmits the operation evaluation request information included in the operation evaluation request to the server control unit 102 (ST36).

Upon receiving the operation evaluation request information, the server control unit 102 transmits the storage medium ID included in the operation evaluation request information to the information management control unit 103 and demands composite access control (ST37).

Upon receiving the storage medium ID from the server control unit 102, the information management control unit 103 acquires the composite access control of the storage medium ID by querying the information management DB 104, and transmits them to the server control unit 102 (ST38).

Upon receiving the composite access control from the information management control unit 103, the server control unit 102 transmits the user information in the operation evaluation request information received in step ST37 and the composite access control acquired from the information management control unit 103 to the policy control unit 105 (ST39).

The policy control unit 105 transmits the user information and the composite access control received from the server control unit 102 to the policy evaluation unit 107 and demands evaluation of the composite access control (ST40).

Upon receiving the user information and the composite access control from the policy control unit 105, the policy evaluation unit 107 evaluates, based on the composite access control, whether the operation of the composite medium is enabled, and transmits a composite policy evaluation result to the policy control unit 105 (ST41).

The policy control unit 105 transmits the composite policy evaluation result received from the policy evaluation unit 107 to the server control unit 102 (ST42).

Upon receiving the composite policy evaluation result from the policy control unit 105, the server control unit 102 transmits the storage medium ID included in the operation evaluation request information acquired from the management demand accepting unit 101 and medium operation information representing "medium discard" to the management file creation unit 110 only when the composite policy evaluation result indicates the discard enable state, and demands that the information management DB 104 be written to. (ST43).

Upon receiving the storage medium ID and the medium operation information representing "medium discard" from the server control unit 102, the management file creation unit 110 changes the management state of the designated storage medium ID from "in use" to "discarded" in the composite medium management table 1042 of the information management DB 104.

The management file creation unit 110 also searches the composite medium management table 1042 of the information management DB 104 for the storage management ID of the designated storage medium ID and changes the management state in the system management table 1041 from "in use" to "discarded" for all storage management IDs.

After completing write in the composite medium management table 1042 and the system management table 1041 of the information management DB 104, the management file creation unit 110 transmits processing result information to the server control unit 102 (ST44).

Upon receiving the processing result information from the management file creation unit 110, the server control unit 102 transmits the storage medium ID that has undergone the processing and the processing result information to the management demand accepting unit 101 (ST45).

The management demand accepting unit 101 transmits an operation evaluation response including the storage medium ID and the processing result information to the client apparatus 200 (ST46).

Upon receiving the operation evaluation response, the management demand communication unit 205 transmits the storage medium ID and the processing result information included in the operation evaluation response to the client control unit 202 (ST47).

The client control unit 202 transmits the storage medium ID and the processing result information to the demand request unit 201 (ST48).

As described above, according to this embodiment, it is determined, based on the at least one policy file read out based on at least one parent management ID in a medium storage request and user information in the medium storage request, whether medium storage responding to the medium storage request is possible. If the medium storage is possible, composite access control which do not violate any management rules included in the at least one policy file are created. With this arrangement, when storing a plurality of documents having different management rules in a single medium, the management rules of the medium, which do not violate the management rules, can be created from the management rules.

In addition, a composite medium is managed by the created composite management rules. With this arrangement, it is possible to appropriately manage the composite medium without violating any management rules.

When the composite policy generation unit 108 is provided independently of the information management server apparatus 100, composite management rules which do not violate any management rules of each management target can be created from the management rules of the management targets not only when storing the documents in a single medium but also when creating composite management rules which do not violate any management rules of each management target from the management rules of the management targets.

Second Embodiment

A composite medium management system according to the second embodiment will be described next.

In the first embodiment, the procedure of storing a management file including a duplicated electronic file in an external storage medium such as a DVD or a CD has been described.

In this embodiment, the procedure of processing of newly issuing a management ID for a duplicated paper document duplicated by printing or reproduction and storing it in a binder to which a storage medium ID is added will be described concerning only parts different from the first embodiment. The main differences are as follows.

In the first embodiment, the client apparatus 200 acquires the storage medium ID of an external storage medium and a management file to be stored in the storage medium from the information management server apparatus 100.

In this embodiment, however, the storage medium ID of a binder or the like that stores a duplicated paper document and a management ID to be added to the duplicated paper document to be stored in the composite medium are acquired.

Figure 27:
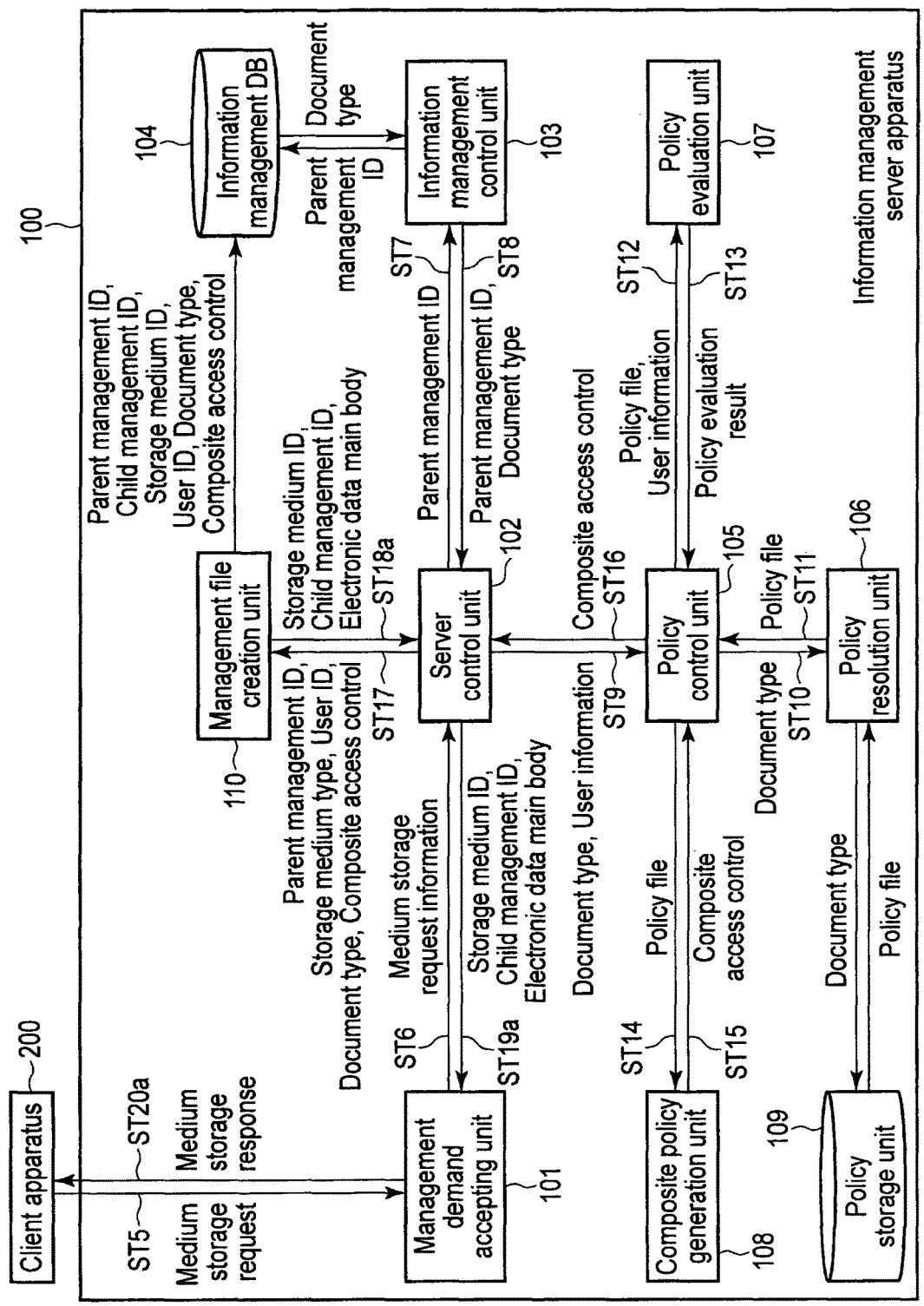
FIG. 27 is a schematic view for explaining the operation of a composite medium management system according to the second embodiment.
Figure 28:
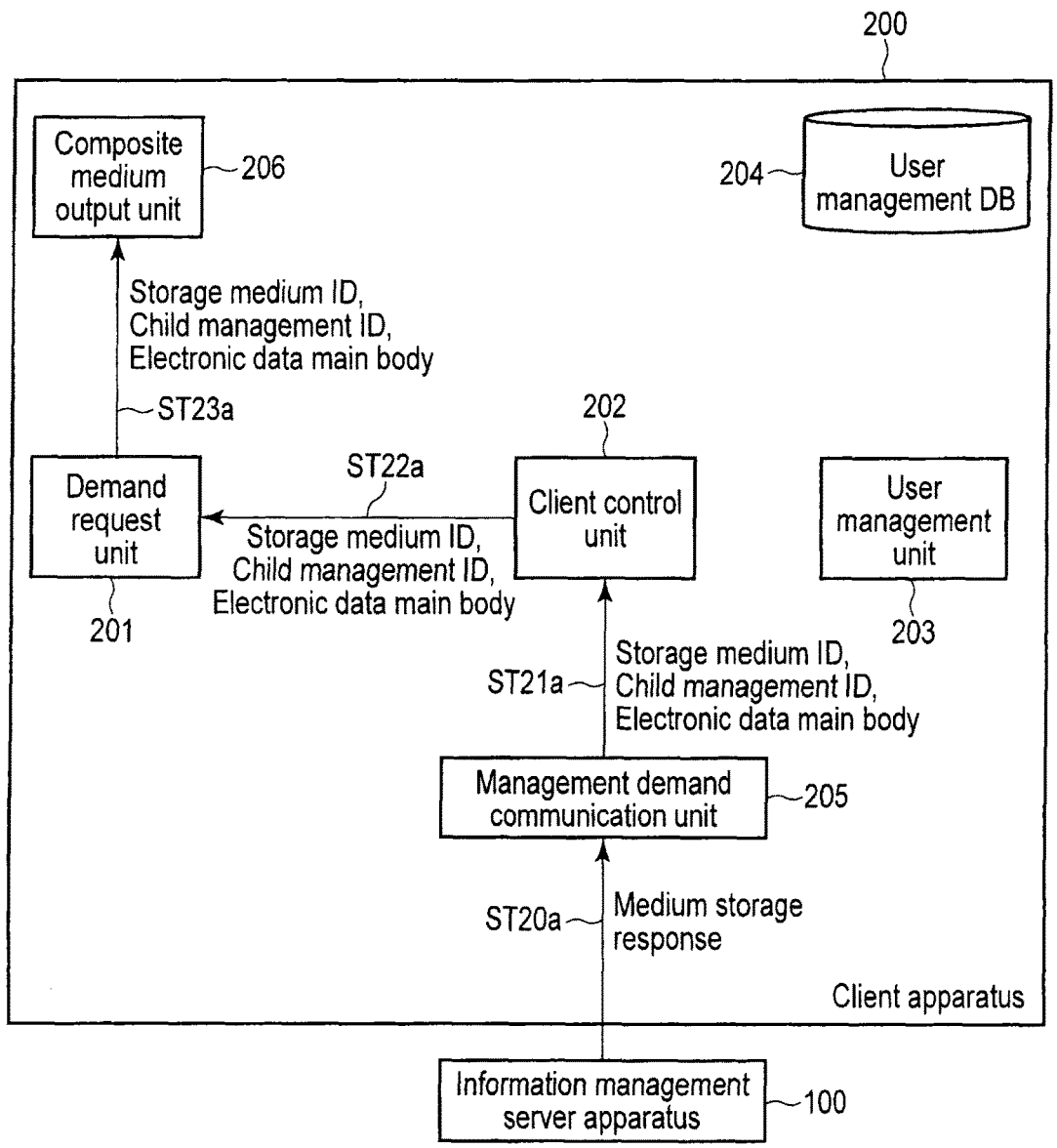
FIG. 28 is a schematic view for explaining an operation according to the embodiment.

The operation of the composite medium management system having the above-described arrangement will be described next with reference to the schematic views of FIGS. 27 and 28.

A general operation will be described first.

[General Operation of Storing Copy Paper Document in New Composite Medium]

A client apparatus 200 transmits a medium storage request including at least one parent management ID indicating at least one duplication target and user information including the user authority of the duplication request source to an information management server apparatus 100.

Upon receiving the medium storage request from the client apparatus 200, the information management server apparatus 100 reads out at least one document type from a system management table 1041 based on the at least one parent management ID in the medium storage request.

The information management server apparatus 100 reads out at least one policy file from a policy storage unit 109 based on the at least one readout document type.

The information management server apparatus 100 evaluates, based on the at least one readout policy file and the user information in the medium storage request, whether medium storage responding to the medium storage request is possible.

Upon evaluating that the medium storage is possible, the information management server apparatus 100 creates composite access control which do not violate any management rules included in the at least one policy file.

The information management server apparatus 100 sends a creation demand including the at least one parent management ID in the medium storage request, the readout document type, and the created composite access control.

Upon receiving the creation demand, the system management table 1041 is searched for the most significant parent management ID based on the management ID represented by the parent management ID in the creation demand. Electronic data main body is read out from a data original management table 1044 based on the management ID represented by the found parent management ID, and a new management ID is created.

The information management server apparatus 100 creates the storage medium ID of a composite medium that stores a duplicated paper document formed by printing the electronic data main body.

The information management server apparatus 100 updates the system management table 1041 so as to write the created management ID, the parent management ID and document type in the creation demand, and the created storage medium ID in association with each other.

The information management server apparatus 100 updates a composite medium management table 1042 so as to write the created storage medium ID, the created management ID, and the composite access control in the creation demand in association with each other.

The information management server apparatus 100 transmits a medium storage response including the created storage medium ID, the created management ID, and the readout electronic data main body to the client apparatus 200.

The client apparatus 200 extracts the storage medium ID, the management ID, and the electronic data main body from the medium storage response received from the information management server apparatus 100, and sends the storage medium ID, the management ID, and the electronic data main body.

Note that the client apparatus 200 may print the sent storage medium ID on a label sheet to be pasted onto the composite medium. The client apparatus 200 may create the duplicated paper document by printing the sent management ID and electronic data main body on paper. The printed paper document is stored in a composite medium such as a binder.

[Detailed Operation of Storing Copy Paper Document in New Composite Medium]

The client apparatus 200 transmits a medium storage request to the information management server apparatus 100 in accordance with the same procedure as in steps ST1 to ST5 of the first embodiment.

In the information management server apparatus 100, a server control unit 102 transmits the parent management ID, the storage medium type, the user ID, the document type, and the composite access control to a management file creation unit 110 and demands issuance of a storage medium ID and a management ID to be added to the duplicated paper document in accordance with the same procedure as in steps ST6 to ST17 of the first embodiment.

Upon receiving the parent management ID, the storage medium type, the user ID, the document type, and the composite access control from the server control unit 102, the management file creation unit 110 newly issues a unique management ID as a child management ID, searches the system management table 1041 of an information management DB 104 for a management ID serving as "Root" based on the parent management ID, and acquires the electronic data main body of the management ID representing the data original from the data original management table 1044 of the information management DB 104. The management file creation unit 110 also issues a unique storage medium ID.

The management file creation unit 110 stores the parent management ID, the storage medium type, the document type, the user ID, and the issued storage medium ID, which are acquired from the server control unit 102, in the system management table 1041 in association with the issued child management ID.

At this time, the management file creation unit 110 sets the management state to "in use", copies the access control stored in association with the parent management ID, and stores them in the system management table 1041 in association with the child management ID. The management file creation unit 110 also stores the child management ID to be added to the duplicated paper document to be stored in the composite medium, the user ID of the administrator of the medium, the medium type, and the composite access control in the composite medium management table 1042 of the information management DB 104 in association with the storage medium ID. At this time, the management state is stored as "in use".

The management file creation unit 110 sends the issued storage medium ID, the child management ID, and the electronic data main body as the original data of the parent management ID to the server control unit 102 (ST18a). In place of the access control stored in the system management table 1041 in association with the child management ID, the composite access control of the composite medium may be duplicated. In place of the electronic data main body as the original data, the storage destination information of the electronic data main body may be transmitted.

The server control unit 102 transmits the storage medium ID, the child management ID, and the electronic data main body acquired from the management file creation unit 110 to a management demand accepting unit 101 (ST19a).

The management demand accepting unit 101 transmits a medium storage response including the storage medium ID, the child management ID, and the electronic data main body to the client apparatus 200 as a response to the medium storage request received in step ST6 (ST20a).

A management demand communication unit 205 transmits the storage medium ID, the child management ID, and the electronic data main body included in the medium storage response received from the information management server apparatus 100 to a client control unit 202 (ST21a).

The client control unit 202 transmits the storage medium ID, the child management ID, and the electronic data main body to a demand request unit 201 (ST22a).

The demand request unit 201 transmits the storage medium ID, the child management ID, and the electronic data main body to a composite medium output unit 206 (ST23a).

The composite medium output unit 206 prints the storage medium ID to be pasted onto a composite medium and the paper document of the electronic data with the child management ID. The storage medium ID to be pasted onto the composite medium may have a form of an adhesive label or may be converted into a code such as a two-dimensional code or a bar code by an optical means and printed. Alternatively, an electronic tag such as an RFID may be pasted.

As described above, according to this embodiment, it is possible to obtain the same effects as in the first embodiment even when storing a duplicated paper document in a new composite medium.

Third Embodiment

A composite medium management system according to the third embodiment will be described next.

In the first embodiment, the procedure of storing a management file in a new composite medium for the first time has been described.

In this embodiment, the first embodiment is modified, and the procedure of newly adding a management file in an already existing composite medium having a storage medium ID will be described. More specifically, in the modification of the first embodiment, only when additional storage to an external storage medium such as a DVD or a CD is possible, the composite access control of the composite medium to additionally store may be changed by the access control of the newly stored management file.

Accordingly, an information management server apparatus 100 further has following functions (b1) to (b5). In this embodiment, however, arbitrary additional items such as various kinds of information or the functions of steps are added to the functions (b1) to (b5) upon request. In addition, the functions (b1) to (b5) are representative examples and include arbitrary additional items to some extent.

(b1) Function of, upon receiving a duplication addition request including at least one parent management ID indicating at least one duplication addition target, a storage medium ID representing a storage destination, and user information including the user authority of the duplication addition request source from a client apparatus 200, reading out at least one document type from a system management table 1041 based on the at least one parent management ID in the duplication addition request.

(b2) Function of reading out composite access control from a composite medium management table 1042 based on the storage medium ID in the duplication addition request.

(b3) Duplication addition evaluation function of evaluating, based on a policy file read out from a policy storage unit 109 based on the readout document type, the readout composite access control, and the user information in the duplication addition request, whether duplication addition responding to the duplication addition request is possible.

(b4) Function of, upon evaluating by the duplication addition evaluation function that duplication addition is possible, creating new composite access control which do not violate any management rules included in the policy file used for the evaluation and the composite access control used for the evaluation.

(b5) Function of sending a creation demand including the at least one parent management ID in the duplication addition request, the readout document type, and the new composite access control.

The operation of the composite medium management system having the above-described arrangement will be described next with reference to the schematic views of FIGS. 29 to 31.

A demand request unit 201 of the client apparatus 200 transmits a duplication addition demand including the parent management ID of a document to be stored in a composite medium, the storage medium ID of the composite medium as the storage destination, and the user ID of the storage medium to a client control unit 202 (ST51).

The client control unit 202 transmits duplication addition request information including the user information acquired from a user management unit 203, and the parent management ID, the storage medium ID, and the user ID designated by the duplication addition demand of the demand request unit 201 to a management demand communication unit 205 in accordance with the same procedure (ST52 and ST53) as in steps ST2 and ST3 of the first embodiment (ST54).

Upon receiving the duplication addition request information from the client control unit 202, the management demand communication unit 205 transmits the duplication addition request information to the information management server apparatus 100 (ST55).

Upon receiving the duplication addition request from the client apparatus 200, a management demand accepting unit 101 of the information management server apparatus 100 transmits the duplication addition request information included in the request to a server control unit 102 (ST56).

Upon receiving the duplication addition request information from the management demand accepting unit 101, the server control unit 102 transmits the parent management ID and the storage medium ID included in the information to an information management control unit 103 and demands the document type of the parent management ID and the composite access control of the storage medium ID (ST57).

Upon receiving at least one parent management ID and the storage medium ID from the server control unit 102, the information management control unit 103 acquires the document type of the parent management ID by querying the system management table 1041 of an information management DB 104, acquires the composite access control of the storage medium ID by querying a composite medium management table 1042 of the information management DB 104, and transmits them to the server control unit 102 (ST58).

Upon receiving the document type of the parent management ID and the composite access control of the storage medium ID from the information management control unit 103, the server control unit 102 transmits the user information included in the duplication addition request information acquired from the management demand accepting unit 101 and the document type and the composite access control acquired from the information management control unit 103 to a policy control unit 105 (ST59).

Upon receiving the user information, the document type, and the composite access control from the server control unit 102, the policy control unit 105 transmits the document type to a policy resolution unit 106, acquires a corresponding policy file from the policy resolution unit 106, transmits the policy file and the user information to a policy evaluation unit 107, and acquires a policy evaluation result from the policy evaluation unit 107 as in steps ST10 to ST13 of the first embodiment (ST60 to ST63).

The policy control unit 105 transmits all policy files and the composite access control of the composite medium to a composite policy generation unit 108 only when all policy evaluation results indicate "enable", and then demands creation of new composite access control from the composite policy generation unit 108 (ST64).

Upon receiving the policy files and the composite access control of the composite medium from the policy control unit 105, the composite policy generation unit 108 creates new composite access control which do not violate the policy file of the document to be newly added and the composite access control of the composite medium, and transmits them to the policy control unit 105 in accordance with the same procedure as in procedure ST15 of the first embodiment (ST65).

The policy control unit 105 transmits the new composite access control received from the composite policy generation unit 108 to the server control unit 102 (ST66).

The server control unit 102 transmits the parent management ID, the storage medium ID, and the user ID included in the duplication addition request information received from the management demand accepting unit 101, the document type received from the information management control unit 103, and the new composite access control received from the policy control unit 105 to a management file creation unit 110, and demands creation of a management file to be stored in the composite medium designated by the storage medium ID (ST67).

Upon receiving the parent management ID, the storage medium ID, the user ID, the document type, and the new composite access control from the server control unit 102, the management file creation unit 110 newly issues a unique management ID as a child management ID, searches the system management table 1041 of the information management DB 104 for a management ID serving as "Root" based on the parent management ID, acquires the electronic data main body of the management ID representing the data original from the data original management table 1044 of the information management DB 104, and creates a management file including the electronic data and the management ID.

The management file creation unit 110 stores the parent management ID, the document types, the user ID, the storage medium ID, and a medium type to which "duplicated data" is input, which are acquired from the server control unit 102, in the system management table 1041 in association with the issued child management ID. At this time, the management state is stored as "in use".

The management file creation unit 110 transmits the storage medium ID and the management file to the server control unit 102 (ST68). In place of the access control stored in the system management table 1041 in association with the child management ID, the composite access control of the composite medium that stores the management file including the child management ID may be duplicated, as in the first embodiment.

The server control unit 102 transmits the storage medium ID and the management file received from the management file creation unit 110 to the management demand accepting unit 101 (ST69).

The management demand accepting unit 101 transmits a duplication addition response including the storage medium ID and the management file received from the server control unit 102 to the client apparatus 200 (ST70).

The management demand communication unit 205 of the client apparatus 200 transmits the storage medium ID and the management file included in the duplication addition response received from the information management server apparatus 100 to the client control unit 202 (ST71).

The client control unit 202 transmits the storage medium ID and the management file to the demand request unit 201 (ST72).

The demand request unit 201 transmits the storage medium ID and the management file to the composite medium output unit 206 (ST73).

The composite medium output unit 206 additionally records the management file in the composite medium whose label surface has a printed storage medium ID matching the storage medium ID.

As described above, according to this embodiment, it is determined, based on the policy file and composite access control read out based on the duplication addition request and user information in the duplication addition request, whether duplication addition responding to the duplication addition request is possible. If duplication addition is possible, new composite access control which do not violate any management rules included in the policy file used for the evaluation and the composite access control used for the evaluation are created. With this arrangement, in addition to the same effects as in the first embodiment, the management rules of the medium, which do not violate the management rules, can be created from the management rules even when the composite access control of the composite medium are changed by duplication addition.

Fourth Embodiment

A composite medium management system according to the fourth embodiment will be described next.

In the second embodiment, the procedure of storing a duplicated paper document in a new composite medium for the first time has been described.

This embodiment is a modification of the second embodiment, and the procedure of newly adding a duplicated paper document in an already existing composite medium having a storage medium ID will be described, as in the third embodiment.

More specifically, in the modification of the second embodiment, when newly adding a duplicated paper document to a composite medium such as a paper binder that binds duplicated paper documents, the composite access control of the composite medium may be changed by the access control of the newly added duplicated paper document.

Accordingly, an information management server apparatus 100 further has the functions (b1) to (b5) described in the third embodiment in addition to the arrangement described in the second embodiment. In this embodiment, however, arbitrary additional items such as various kinds of information or the functions of steps are added to the functions (b1) to (b5) upon request. In addition, since the functions (b1) to (b5) are representative examples and include arbitrary additional items to some extent.

The operation of the composite medium management system having the above-described arrangement will be described next with reference to the schematic views of FIGS. 32 and 33.

A client apparatus 200 transmits a duplication addition request including user information acquired from a user management unit 203 and a parent management ID, a storage medium ID, and a user ID designated by a duplication addition demand of a demand request unit 201 to the information management server apparatus 100, and demands issuance of the child management ID of a duplicated paper document to be stored in a composite medium of the storage medium ID in accordance with the same procedure as in steps ST51 to ST55 of the third embodiment.

In the information management server apparatus 100, a server control unit 102 transmits a document type from an information management control unit 103, new composite access control from a policy control unit 105, and the parent management ID, the storage medium ID, and the user ID included in the duplication addition request information to a management file creation unit 110, and demands issuance of a child management ID to be added to the duplicated paper document in accordance with the same procedure as in steps ST56 to ST67 of the third embodiment, Upon receiving the parent management ID, the storage medium ID, the user ID, the document type, and the new composite access control from the server control unit 102, the management file creation unit 110 newly issues a unique management ID as a child management ID, searches a system management table 1041 of an information management DB 104 for a management ID serving as "Root" based on the parent management ID, and acquires the electronic data main body of the management ID representing the data original from a data original management table 1044 of the information management DB 104.

The management file creation unit 110 stores the parent management ID, the document types, the user ID, the storage medium ID, and a medium type to which "paper" is input, which are acquired from the server control unit 102, in the system management table 1041 in association with the issued child management ID. At this time, the management state is stored as "in use", and the access control stored in association with the parent management ID are duplicated and stored in the system management table 1041 in association with the child management ID.

The management file creation unit 110 also adds the child management ID of the duplicated paper document to be stored in the composite medium to the storage medium ID in a composite medium management table 1042 of the information management DB 104 and updates the new composite access control. At this time, the management state is stored as "in use".

The management file creation unit 110 transmits the storage medium ID, the child management ID, and the electronic data entity to the server control unit 102 (ST68a). In place of the access control stored in the system management table 1041 in association with the child management ID, the composite access control of the composite medium that stores the duplicated paper document to which the child management ID is added may be duplicated, as in the first embodiment.

The server control unit 102 transmits the storage medium ID, the child management ID, and the electronic data entity and to a management demand accepting unit 101 (ST69a).

The management demand accepting unit 101 transmits a duplication addition response including the storage medium ID, the child management ID, and the electronic data entity to the client apparatus 200 (ST70a).

A management demand communication unit 205 transmits the storage medium ID, the child management ID, and the electronic data main body included in the duplication addition response received from the information management server apparatus 100 to a client control unit 202 (ST71a).

The client control unit 202 transmits the storage medium ID, the child management ID, and the electronic data main body to the demand request unit 201 (ST72a).

The demand request unit 201 transmits the storage medium ID, the child management ID, and the electronic data main body to a composite medium output unit 206 (ST73*a*).

The composite medium output unit 206 prints the storage medium ID to be pasted onto a composite medium and the paper document of the electronic data with the child management ID. The storage medium ID to be pasted onto the composite medium may have a shape of an adhesive label. However, since the duplication of the paper document is added to the already existing composite medium (for example, paper binder), the storage medium ID need not always be pasted.

As described above, according to this embodiment, in addition to the same effects as in the second embodiment, the arrangement having the same functions (b1) to (b5) as in the third embodiment makes it possible to create the management rules of a medium, which do not violate the management rules, from the management rules, as in the third embodiments, even when additionally storing a duplicated paper document in an existing composite medium.

According to at least one embodiment described above, it is determined, based on at least one policy file read out based on at least one parent management ID in a medium storage request and user information in the medium storage request, whether medium storage responding to the medium storage request is possible. If the medium storage is possible, composite access control which do not violate any management rules included in the at least one policy file are created. With this arrangement, when storing a plurality of documents having different management rules in a single medium, the management rules of the medium, which do not violate the management rules, can be created from the management rules.

When the composite policy generation unit 108 is provided independently of the information management server apparatus 100, composite management rules which do not violate any management rules of each management target can be created from the management rules of the management targets not only when storing the documents in a single medium but also in general.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A composite medium management system including comprising:
   an information management server apparatus; and
   a client apparatus, the information management server apparatus and the client apparatus being configured to communicate with each other, wherein
   the information management server apparatus comprises:
      a first storage unit which stores a data original management table in which an entity ID serving as a management ID of original data and an electronic data main body of the original data are written in association with each other;
      a second storage unit which stores a system management table in which the management ID of duplicated data sequentially duplicated from the original data, a parent management ID representing the management ID of one of the duplicated data and the original data of a duplication source of the duplicated data, a document type of the duplicated data, and a storage medium ID of a composite medium that stores the duplicated data are written in association with each other, each of the management ID of the duplicated data being a unique ID in the composite medium management system;
      a third storage unit which stores a composite medium management table in which the storage medium ID, the management ID added to the duplicated data stored in the composite medium, and composite access control representing one of a discard period and a takeout range of the composite medium and information representing a viewable user are written in association with each other;
      a fourth storage unit which stores a policy file that defines management rules including an access control representing one of a term of management and the takeout range of the composite medium and the information representing the viewable user for each document type;
      a unit which, upon receiving a medium storage request including at least one parent management ID indicating at least one duplication target and user information including a user authority of a duplication request source from the client apparatus, reads out at least one document type from the system management table based on the at least one parent management ID in the medium storage request;
a unit which reads at least one policy file from the fourth storage unit based on the at least one readout document type;
a unit which evaluates, based on the at least one readout policy file and the user information in the medium storage request, whether medium storage responding to the medium storage request is possible;
a unit which, upon evaluating that the medium storage is possible, creates the composite access control which do not violate any management rules included in the at least one policy file;
a unit which sends a creation demand including the at least one parent management ID in the medium storage request, the readout document type, and the created composite access control;
a unit which, upon receiving the creation demand, searches the system management table for a most significant parent management ID based on the management ID represented by the parent management ID in the creation demand, reads out the electronic data main body from the data original management table based on the management ID represented by the found parent management ID, and creates a management file by adding a new management ID to the duplicated data generated by duplicating the electronic data main body;
a unit which creates the storage medium ID of the composite medium that stores the created management file;
a unit which updates the system management table so as to write the added management ID, the parent management ID and the document type in the creation demand, and the created storage medium ID in association with each other;
a unit which updates the composite medium management table so as to write the created storage medium ID, the added management ID, and the composite access control in the creation demand in association with each other; and
a unit which transmits a medium storage response including the created storage medium ID and the management file to the client apparatus, and
the client apparatus comprises:
a unit which transmits the medium storage request to the information management server apparatus; and
a unit which extracts the storage medium ID and the management file from the medium storage response received from the information management server apparatus and sends the storage medium ID and the management file.

2. The composite medium management system according to claim 1, wherein the client apparatus further comprises:
a unit which prints the sent storage medium ID on label paper to be pasted onto the composite medium; and
a unit which writes the sent management file in the composite medium.

3. The composite medium management system according to claim 1, wherein a management state representing one of an in-use state and a discarded state of the composite medium having the storage medium ID can further be written in the system management table in association with the storage medium ID,
the information management server apparatus further comprises:

a unit which, upon receiving a medium discard demand including the storage medium ID of a discard target and the user information of a discard request source from the client apparatus, reads out the composite access control from the composite medium management table based on the storage medium ID;
a discard evaluation unit which evaluates, based on the readout composite access control and the user information in the medium discard demand, whether discard of the composite medium indicated by the storage medium ID in the medium discard demand is possible;
a unit which, upon evaluating by the discard evaluation unit that the discard is possible, writes the management state representing the discarded state in association with the storage medium ID in the system management table based on the storage medium ID in the medium discard demand; and
a unit which transmits a discard evaluation response including write completion information of the discarded state and the storage medium ID in the medium discard demand to the client apparatus, and
the client apparatus further comprises:
a unit which transmits the medium discard demand to the information management server apparatus; and
a unit which extracts the storage medium ID and the write completion information of the discarded state from the discard evaluation response received from the information management server apparatus and sends the storage medium ID and the write completion information.

4. A composite medium management system comprising:
an information management server apparatus; and
a client apparatus, the information management server apparatus and the client apparatus being configured to communicate with each other, wherein
the information management server apparatus comprises:
a first storage unit which stores a data original management table in which an entity ID serving as a management ID of original data and an electronic data main body of the original data are written in association with each other;
a second storage unit which stores a system management table in which the management ID of a duplicated paper document sequentially duplicated from the original data, a parent management ID representing the management ID of one of the duplicated paper document and the original data of a duplication source of the duplicated paper document, a document type of the duplicated paper document, and a storage medium ID of a composite medium that stores the duplicated paper document are written in association with each other, each of the management ID of the duplicated data being a unique ID in the composite medium management system;
a third storage unit which stores a composite medium management table in which the storage medium ID, the management ID added to the duplicated paper document stored in the composite medium, and composite access control representing one of a discard period and a takeout range of the composite medium and information representing a viewable user are written in association with each other;
a fourth storage unit which stores a policy file that defines management rules including an access control representing one of a term of management and the takeout range of the composite medium and the information representing the viewable user for each document type;

a unit which, upon receiving a medium storage request including at least one parent management ID indicating at least one duplication target and user information including a user authority of a duplication request source from the client apparatus, reads out at least one document type from the system management table based on the at least one parent management ID in the medium storage request;

a unit which reads at least one policy file from the fourth storage unit based on the at least one readout document type;

a unit which evaluates, based on the at least one readout policy file and the user information in the medium storage request, whether medium storage responding to the medium storage request is possible;

a unit which, upon evaluating that the medium storage is possible, creates the composite access control which do not violate any management rules included in the at least one policy file;

a unit which sends a creation demand including the at least one parent management ID in the medium storage request, the readout document type, and the created composite access control;

a unit which, upon receiving the creation demand, searches the system management table for a most significant parent management ID based on the management ID represented by the parent management ID in the creation demand, reads out the electronic data main body from the data original management table based on the management ID represented by the found parent management ID, and creates a new management ID;

a unit which creates the storage medium ID of the composite medium that stores the duplicated paper document obtained by printing the electronic data main body;

a unit which updates the system management table so as to write the created management ID, the parent management ID and the document type in the creation demand, and the created storage medium ID in association with each other;

a unit which updates the composite medium management table so as to write the created storage medium ID, the created management ID, and the composite access control in the creation demand in association with each other; and a unit which transmits a medium storage response including the created storage medium ID, the created management ID, and the readout electronic data main body to the client apparatus, and the client apparatus comprises:

a unit which transmits the medium storage request to the information management server apparatus; and a unit which extracts the storage medium ID, the management ID, and the electronic data main body from the medium storage response received from the information management server apparatus and sends the storage medium ID, the management ID, and the electronic data main body.

5. The composite medium management system according to claim 4, wherein the client apparatus further comprises:
a unit which prints the sent storage medium ID on label paper to be pasted onto the composite medium; and
a unit which creates the duplicated paper document by printing the sent management ID and electronic data main body on paper.

6. The composite medium management system according to claim 4, wherein the information management server apparatus further comprises:

a unit which, upon receiving a duplication addition request including the at least one parent management ID indicating at least one duplication addition target, the storage medium ID representing a storage destination, and the user information including the user authority of a duplication addition request source from the client apparatus, reads out at least one document type from the system management table based on the at least one parent management ID in the duplication addition request;

a unit which reads the composite access control from the composite medium management table based on the storage medium ID in the duplication addition request;

a duplication addition evaluation unit which evaluates, based on the policy file read out from the fourth storage unit based on the readout document type, the readout composite access control, and the user information in the duplication addition request, whether duplication addition responding to the duplication addition request is possible;

a unit which, upon evaluating by the duplication addition evaluation unit that the duplication addition is possible, creates new composite access control which do not violate any management rules included in the policy file used for the evaluation and the composite access control used for the evaluation; and a unit which sends a creation demand including the at least one parent management ID in the duplication addition request, the readout document type, and the new composite access control.

7. An information management server apparatus capable of communicating with a client apparatus, the information management server apparatus comprising:

a first storage unit which stores a data original management table in which an entity ID serving as a management ID of original data and an electronic data main body of the original data are written in association with each other;

a second storage unit which stores a system management table in which the management ID of duplicated data sequentially duplicated from the original data, a parent management ID representing the management ID of one of the duplicated data and the original data of a duplication source of the duplicated data, a document type of the duplicated data, and a storage medium ID of a composite medium that stores the duplicated data are written in association with each other, each of the management ID of the duplicated data being a unique ID in the information management server apparatus;

a third storage unit which stores a composite medium management table in which the storage medium ID, the management ID added to the duplicated data stored in the composite medium, and composite access control representing one of a discard period and a takeout range of the composite medium and information representing a viewable user are written in association with each other;

a fourth storage unit which stores a policy file that defines management rules including an access control representing one of a term of management and the takeout range of the composite medium and the information representing the viewable user for each document type;

a unit which, upon receiving a medium storage request including at least one parent management ID indicating at least one duplication target and user information including a user authority of a duplication request source from the client apparatus, reads out at least one document type from the system management table based on the at least one parent management ID in the medium storage request;

a unit which reads at least one policy file from the fourth storage unit based on the at least one readout document type;

a unit which evaluates, based on the at least one readout policy file and the user information in the medium storage request, whether medium storage responding to the medium storage request is possible;

a unit which, upon evaluating that the medium storage is possible, creates the composite access control which do not violate any management rules included in the at least one policy file;

a unit which sends a creation demand including the at least one parent management ID in the medium storage request, the readout document type, and the created composite access control;

a unit which, upon receiving the creation demand, searches the system management table for a most significant parent management ID based on the management ID represented by the parent management ID in the creation demand, reads out the electronic data main body from the data original management table based on the management ID represented by the found parent management ID, and creates a management file by adding a new management ID to the duplicated data generated by duplicating the electronic data main body;

a unit which creates the storage medium ID of the composite medium that stores the created management file;

a unit which updates the system management table so as to write the added management ID, the parent management ID and the document type in the creation demand, and the created storage medium ID in association with each other;

a unit which updates the composite medium management table so as to write the created storage medium ID, the added management ID, and the composite access control in the creation demand in association with each other; and a unit which transmits a medium storage response including the created storage medium ID and the management file to the client apparatus.

8. An information management server apparatus capable of communicating with a client apparatus, the information management server apparatus comprising:

a first storage unit which stores a data original management table in which an entity ID serving as a management ID of original data and an electronic data main body of the original data are written in association with each other;

a second storage unit which stores a system management table in which the management ID of a duplicated paper document sequentially duplicated from the original data, a parent management ID representing the management ID of one of the duplicated paper document and the original data of a duplication source of the duplicated paper document, a document type of the duplicated paper document, and a storage medium ID of a composite medium that stores the duplicated paper document are written in association with each other, each of the management ID of the duplicated data being a unique ID in the information management server apparatus;

a third storage unit which stores a composite medium management table in which the storage medium ID, the management ID added to the duplicated paper document stored in the composite medium, and composite access control representing one of a discard period and a takeout range of the composite medium and information representing a viewable user are written in association with each other;

a fourth storage unit which stores a policy file that defines management rules including an access control representing one of a term of management and the takeout range of the composite medium and the information representing the viewable user for each document type;

a unit which, upon receiving a medium storage request including at least one parent management ID indicating at least one duplication target and user information including a user authority of a duplication request source from the client apparatus, reads out at least one document type from the system management table based on the at least one parent management ID in the medium storage request;

a unit which reads at least one policy file from the fourth storage unit based on the at least one readout document type;

a unit which evaluates, based on the at least one readout policy file and the user information in the medium storage request, whether medium storage responding to the medium storage request is possible;

a unit which, upon evaluating that the medium storage is possible, creates the composite access control which do not violate any management rules included in the at least one policy file;

a unit which sends a creation demand including the at least one parent management ID in the medium storage request, the readout document type, and the created composite access control;

a unit which, upon receiving the creation demand, searches the system management table for a most significant parent management ID based on the management ID represented by the parent management ID in the creation demand, reads out the electronic data main body from the data original management table based on the management ID represented by the found parent management ID, and creates a new management ID;

a unit which creates the storage medium ID of the composite medium that stores the duplicated paper document obtained by printing the electronic data main body;

a unit which updates the system management table so as to write the created management ID, the parent management ID and the document type in the creation demand, and the created storage medium ID in association with each other;

a unit which updates the composite medium management table so as to write the created storage medium ID, the created management ID, and the composite access control in the creation demand in association with each other; and a unit which transmits a medium storage response including the created storage medium ID, the created management ID, and the readout electronic data main body to the client apparatus.

9. A program that is stored in a non-transitory computer-readable storage medium and is to be executed by a processor of an information management server apparatus capable of communicating with a client apparatus and including storage unit, the program comprising:
- a first program code that causes the processor to execute processing of writing, in the storage unit, a data original management table in which an entity ID serving as a management ID of original data and an electronic data main body of the original data are written in association with each other, each of the management ID of the duplicated data being a unique ID in the information management server apparatus;
- a second program code that causes the processor to execute processing of writing, in the storage unit, a system management table in which the management ID of duplicated data sequentially duplicated from the original data, a parent management ID representing the management ID of one of the duplicated data and the original data of a duplication source of the duplicated data, a document type of the duplicated data, and a storage medium ID of a composite medium that stores the duplicated data are written in association with each other;
- a third program code that causes the processor to execute processing of writing, in the storage unit, a composite medium management table in which the storage medium ID, the management ID added to the duplicated data stored in the composite medium, and composite access control representing one of a discard period and a takeout range of the composite medium and information representing a viewable user are written in association with each other;
- a fourth program code that causes the processor to execute processing of writing, in the storage unit, a policy file that defines management rules including an access control representing one of a term of management and the takeout range of the composite medium and the information representing the viewable user for each document type;
- a fifth program code that causes the processor to execute processing of, upon receiving a medium storage request including at least one parent management ID indicating at least one duplication target and user information including a user authority of a duplication request source from the client apparatus, reading out at least one document type from the system management table based on the at least one parent management ID in the medium storage request;
- a sixth program code that causes the processor to execute processing of reading at least one policy file from the storage unit based on the at least one readout document type;
- a seventh program code that causes the processor to execute processing of evaluating, based on the at least one readout policy file and the user information in the medium storage request, whether medium storage responding to the medium storage request is possible;
- an eighth program code that causes the processor to execute processing of, upon evaluating that the medium storage is possible, creating the composite access control which do not violate any management rules included in the at least one policy file;
- a ninth program code that causes the processor to execute processing of sending a creation demand including the at least one parent management ID in the medium storage request, the readout document type, and the created composite access control;
- a 10th program code that causes the processor to execute processing of, upon receiving the creation demand, searching the system management table for a most significant parent management ID based on the management ID represented by the parent management ID in the creation demand, reading out the electronic data main body from the data original management table based on the management ID represented by the found parent management ID, and creating a management file by adding a new management ID to the duplicated data generated by duplicating the electronic data main body;
- an 11th program code that causes the processor to execute processing of creating the storage medium ID of the composite medium that stores the created management file;
- a 12th program code that causes the processor to execute processing of updating the system management table so as to write the added management ID, the parent management ID and the document type in the creation demand, and the created storage medium ID in association with each other;
- a 13th program code that causes the processor to execute processing of updating the composite medium management table so as to write the created storage medium ID, the added management ID, and the composite access control in the creation demand in association with each other; and
- a 14th program code that causes the processor to execute processing of transmitting a medium storage response including the created storage medium ID and the management file to the client apparatus.

10. A program that is stored in a non-transitory computer-readable storage medium and is to be executed by a processor of an information management server apparatus capable of communicating with a client apparatus and including storage unit, the program comprising:
- a first program code that causes the processor to execute processing of writing, in the storage unit, a data original management table in which an entity ID serving as a management ID of original data and an electronic data main body of the original data are written in association with each other;
- a second program code that causes the processor to execute processing of writing, in the storage unit, a system management table in which the management ID of a duplicated paper document sequentially duplicated from the original data, a parent management ID representing the management ID of one of the duplicated paper document and the original data of a duplication source of the duplicated paper document, a document type of the duplicated paper document, and a storage medium ID of a composite medium that stores the duplicated paper document are written in association with each other, each of the management ID of the duplicated data being a unique ID in the information management server apparatus;
- a third program code that causes the processor to execute processing of writing, in the storage unit, a composite medium management table in which the storage medium ID, the management ID added to the duplicated paper document stored in the composite medium, and composite access control representing one of a discard period and a takeout range of the composite medium and information representing a viewable user are written in association with each other;

a fourth program code that causes the processor to execute processing of writing, in the storage unit, a policy file that defines management rules including an access control representing one of a term of management and the takeout range of the composite medium and the information representing the viewable user for each document type;

a fifth program code that causes the processor to execute processing of, upon receiving a medium storage request including at least one parent management ID indicating at least one duplication target and user information including a user authority of a duplication request source from the client apparatus, reading out at least one document type from the system management table based on the at least one parent management ID in the medium storage request;

a sixth program code that causes the processor to execute processing of reading at least one policy file from the storage unit based on the at least one readout document type;

a seventh program code that causes the processor to execute processing of evaluating, based on the at least one readout policy file and the user information in the medium storage request, whether medium storage responding to the medium storage request is possible;

an eighth program code that causes the processor to execute processing of, upon evaluating that the medium storage is possible, creating the composite access control which do not violate any management rules included in the at least one policy file;

a ninth program code that causes the processor to execute processing of sending a creation demand including the at least one parent management ID in the medium storage request, the readout document type, and the created composite access control;

a 10th program code that causes the processor to execute processing of, upon receiving the creation demand, searching the system management table for a most significant parent management ID based on the management ID represented by the parent management ID in the creation demand, reading out the electronic data main body from the data original management table based on the management ID represented by the found parent management ID, and creating a new management ID;

an 11th program code that causes the processor to execute processing of creating the storage medium ID of the composite medium that stores the duplicated paper document obtained by printing the electronic data main body;

a 12th program code that causes the processor to execute processing of updating the system management table so as to write the created management ID, the parent management ID and the document type in the creation demand, and the created storage medium ID in association with each other;

a 13th program code that causes the processor to execute processing of updating the composite medium management table so as to write the created storage medium ID, the created management ID, and the composite access control in the creation demand in association with each other; and a 14th program code that causes the processor to execute processing of transmitting a medium storage response including the created storage medium ID, the created management ID, and the readout electronic data main body to the client apparatus.

11. A composite access control creation apparatus including a memory, comprising:
a unit which, when a plurality of policy files that define management rules including an access control representing one of a term of management and a takeout range and information representing a viewable user for each type of a plurality of pieces of management target information are input, writes the plurality of policy files in the memory;
a creation unit which creates composite access control which do not violate any management rules included in the plurality of policy files in the memory; and
a unit which outputs the created composite access control.

12. The composite access control creation apparatus according to claim 11, wherein the creation unit comprises:
a unit which extracts a shortest term of validity out of all terms of management included in the plurality of policy files in the memory;
a unit which extracts a longest term of safekeeping out of all terms of management included in the plurality of policy files in the memory;
a unit which creates a discard period representing a period not less than the longest term of safekeeping and not more than the shortest term of validity;
a unit which selects the discard period when the discard period is created or selects one of the extracted term of validity and the extracted term of safekeeping when the discard period is not created;
a unit which extracts a narrowest takeout range out of all takeout ranges included in the plurality of policy files in the memory;
a unit which extracts a user authority in a narrowest range out of all user authorities included in the plurality of policy files in the memory; and
a unit which creates the composite access control including the selected discard period, one of the selected term of validity and the selected term of safekeeping, the extracted takeout range, and the extracted user authority.

13. The composite access control creation apparatus according to claim 12, wherein the creation unit further comprises a unit which outputs error information without creating the composite access control when the shortest term of validity is shorter than the longest term of safekeeping.

14. A program that is stored in a non-transitory computer-readable storage medium and is to be executed by a processor of a composite access control creation apparatus including a memory, the program comprising:
a first program code that causes the processor to execute processing of when a plurality of policy files that define management rules including an access control representing one of a term of management and a takeout range and information representing a viewable user for each type of a plurality of pieces of management target information are input, writing the plurality of policy files in the memory;
a second program code that causes the processor to execute creation processing of creating composite access control which do not violate any management rules included in the plurality of policy files in the memory; and
a third program code that causes the processor to execute processing of outputting the created composite access control.

15. The program according to claim 14, wherein the creation processing includes:
- processing of extracting a shortest term of validity out of all terms of management included in the plurality of policy files in the memory;
- processing of extracting a longest term of safekeeping out of all terms of management included in the plurality of policy files in the memory;
- processing of creating a discard period representing a period not less than the longest term of safekeeping and not more than the shortest term of validity;
- processing of selecting the discard period when the discard period is created or selecting one of the extracted term of validity and the extracted term of safekeeping when the discard period is not created;
- processing of extracting a narrowest takeout range out of all takeout ranges included in the plurality of policy files in the memory;
- processing of extracting a user authority in a narrowest range out of all user authorities included in the plurality of policy files in the memory; and
- processing of creating the composite access control including the selected discard period, one of the selected term of validity and the selected term of safekeeping, the extracted takeout range, and the extracted user authority.

16. The program according to claim 15, wherein the creation processing further includes processing of outputting error information without creating the composite access control when the shortest term of validity is shorter than the longest term of safekeeping.

\* \* \* \* \*